United States Patent
Abraham et al.

(10) Patent No.: US 10,764,742 B1
(45) Date of Patent: *Sep. 1, 2020

(54) SUBSCRIBER MANAGEMENT WITH A STATELESS NETWORK ARCHITECTURE IN A FIFTH GENERATION (5G) NETWORK

(71) Applicant: Cisco Technology, Inc., San Jose, CA (US)

(72) Inventors: Jis Abraham, Bangalore (IN); Aditya Prakash, Karnataka (IN); Vinod Suresh Kamble, Maharastra (IN); Ameo Ghosh, Maharastra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,695

(22) Filed: Jan. 17, 2020

Related U.S. Application Data

(63) Continuation of application No. 16/536,712, filed on Aug. 9, 2019, now Pat. No. 10,582,371.

(51) Int. Cl.
*H04W 8/16* (2009.01)
*H04W 60/00* (2009.01)
(Continued)

(52) U.S. Cl.
CPC ............. *H04W 8/16* (2013.01); *H04L 9/0643* (2013.01); *H04W 12/0017* (2019.01);
(Continued)

(58) Field of Classification Search
None
See application file for complete search history.

(56) References Cited

U.S. PATENT DOCUMENTS

2017/0288972 A1 10/2017 Li et al.
2018/0199279 A1 7/2018 Baek et al.
(Continued)

OTHER PUBLICATIONS

Basin, D. et al., "A Formal Analysis of 5G Authentication", arxiv. org, Oct. 18, 2018 21 pages.
(Continued)

*Primary Examiner* — German Viana Di Prisco
(74) *Attorney, Agent, or Firm* — Edell, Shapiro & Finnan, LLC

(57) ABSTRACT

Fifth Generation (5G) standards specify use of a Subscription Concealed Identifier (SUCI) (i.e. a concealed identity) for a user equipment (UE) during initial registration, where the SUCI is derived from a Subscription Permanent Identifier (SUPI) of the UE. Given the identity concealment and use of different identities on different interfaces in a 5G network, maintaining subscriber state with a stateless network architecture may be challenging. Accordingly, one or more techniques and mechanisms are provided herein for subscriber management with a stateless network architecture in a 5G network, even without the need to maintain intermediate states of a UE in an external data store. The one or more techniques and mechanisms may be provided in relation to processing of Next Generation (NG) Application Protocol (NGAP) signaling messages at an access and mobility management function (AMF), and in particular, in relation to a registration procedure for the UE.

20 Claims, 16 Drawing Sheets

(51) Int. Cl.
*H04W 12/00* (2009.01)
*H04W 12/06* (2009.01)
*H04L 9/06* (2006.01)

(52) U.S. Cl.
CPC . *H04W 12/00518* (2019.01); *H04W 12/0602* (2019.01); *H04W 60/00* (2013.01)

(56) References Cited

U.S. PATENT DOCUMENTS

| | | |
|---|---|---|
| 2018/0227842 A1 | 8/2018 | Chandramouli et al. |
| 2018/0227873 A1 | 8/2018 | Vrzic et al. |
| 2018/0254960 A1 | 9/2018 | Ren et al. |
| 2019/0007500 A1 | 1/2019 | Kim et al. |
| 2019/0021029 A1 | 1/2019 | Rydnell et al. |
| 2019/0037516 A1 | 1/2019 | Kim et al. |
| 2019/0053010 A1 | 2/2019 | Edge et al. |
| 2019/0059067 A1 | 2/2019 | Lee et al. |
| 2019/0098502 A1 | 3/2019 | Torvinen et al. |
| 2019/0150081 A1 | 5/2019 | Qiao et al. |
| 2019/0182654 A1 | 6/2019 | Jerichow et al. |
| 2019/0200208 A1 | 6/2019 | Chandramouli |
| 2019/0230556 A1 | 7/2019 | Lee |
| 2019/0246267 A1 | 8/2019 | Nakarmi et al. |
| 2019/0254094 A1 | 8/2019 | Babu et al. |
| 2019/0268835 A1 | 8/2019 | Shan et al. |
| 2019/0289672 A1 | 9/2019 | Ben Henda et al. |
| 2019/0313468 A1 | 10/2019 | Talebi Fard et al. |
| 2020/0120487 A1* | 4/2020 | Tang ..................... H04W 8/205 |

OTHER PUBLICATIONS

3GPP 5G, "5G; 5G System; Unified Data Management Services", www.etsi.org, 3GPP TS 29.503 version 15.0.0 Release 15, Jul. 2018, 285 pages.

3GPP 5G, "5G; NG-RAN; NG Application Protocol (NGAP)", www.etsi.org, 3GPP TS 38.413 version 15.1.0 Release 15, Sep. 2018, pp. 1-140.

3GPP 5G, "5G; NG-RAN; NG Application Protocol (NGAP)", www.etsi.org, 3GPP TS 38.413 version 15.1.0 Release 15, Sep. 2018, pp. 141-285.

Unknown, "5G Standalone Access: Registration Procedure", Feb. 13, 2019, 7 pages, Generated with EventStudio System Designer—https://www.EventHelix.com/EventStudio/.

3GPP 5G, "5G; Procedures for the 5G System", www.etsi.org, 3GPP TS 23.502 version 15.2.0 Release 15, Jun. 2018, pp. 1-55.

3GPP 5G, "5G; Procedures for the 5G System", www.etsi.org, 3GPP TS 23.502 version 15.2.0 Release 15, Jun. 2018, pp. 56-155.

3GPP 5G, "5G; Procedures for the 5G System", www.etsi.org, 3GPP TS 23.502 version 15.2.0 Release 15, Jun. 2018, pp. 156-311.

* cited by examiner

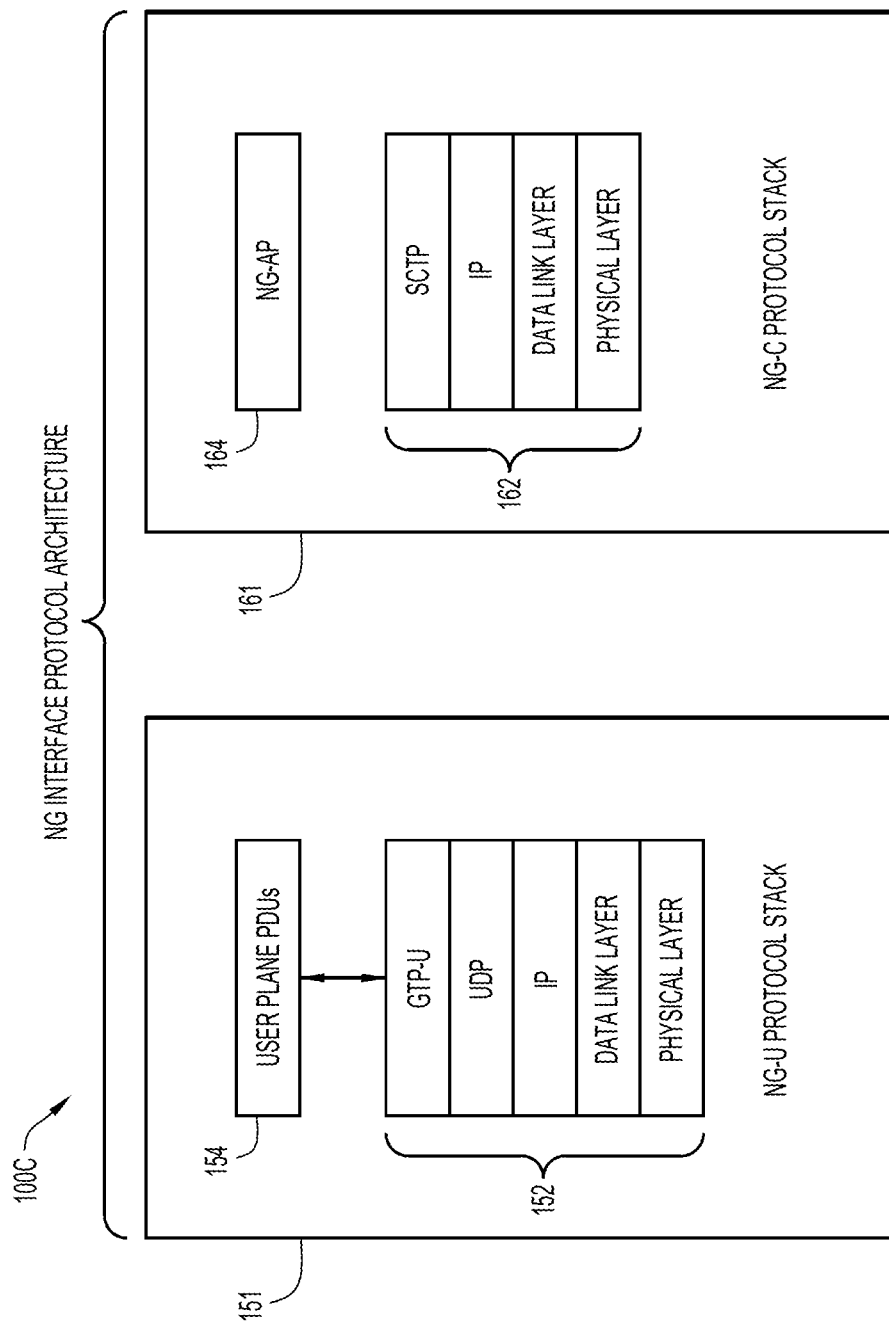

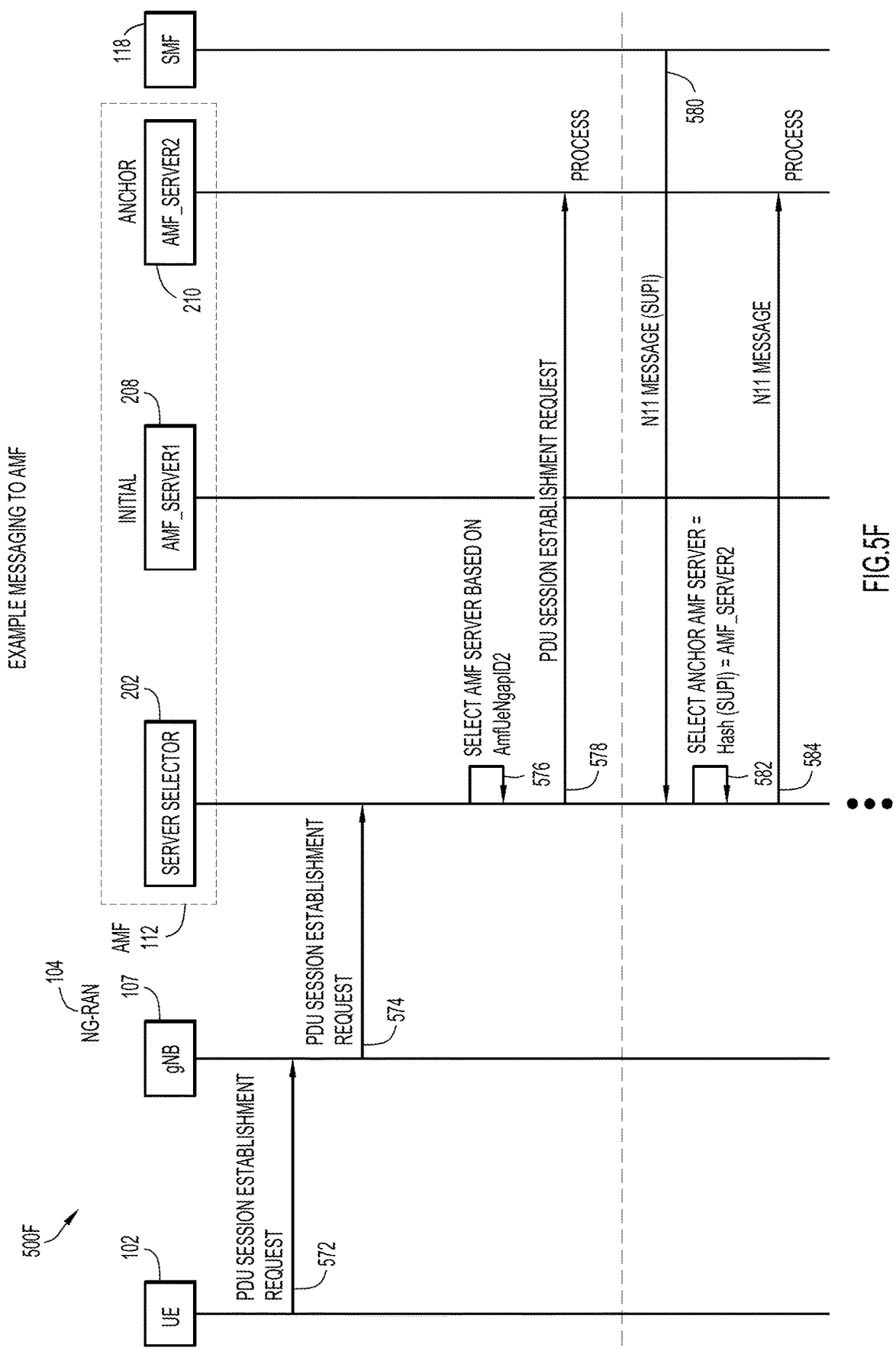

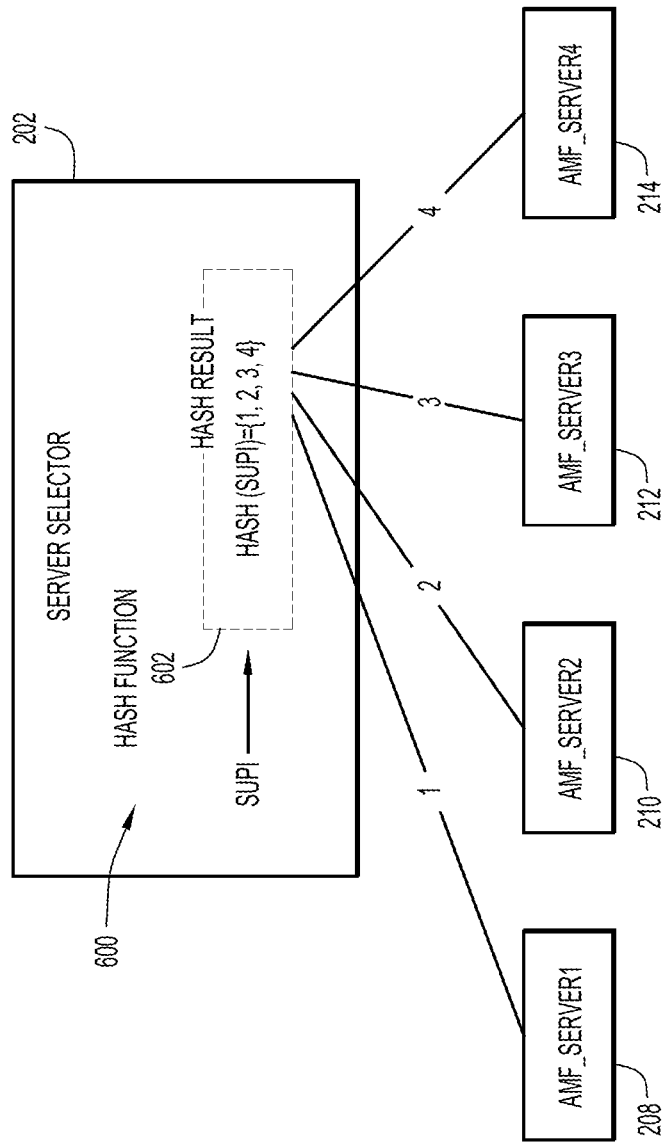

SUBSCRIBER MANAGEMENT WITH A STATELESS NETWORK ARCHITECTURE IN A FIFTH GENERATION (5G) NETWORK

CROSS-REFERENCE TO RELATED APPLICATIONS

This application is a continuation of U.S. patent application Ser. No. 16/536,712, filed Aug. 9, 2019, the entirety of which is incorporated herein by reference.

TECHNICAL FIELD

The present disclosure relates generally to procedures for subscriber management in a Fifth Generation (5G) network, and more particularly to procedures for subscriber management with a stateless network architecture for an Access and Mobility Management Function (AMF) in a 5G network.

BACKGROUND

Prior to the advent of Fifth Generation (5G) standards, a user equipment (UE) of a subscriber was required to reveal its permanent identity "in the clear" over an air interface of a mobile network during a registration procedure. This permanent identity is known as a Subscription Permanent Identifier (SUPI), which in many cases is an International Mobile Subscriber Identity (IMSI) of the subscriber. Once the subscriber was authenticated, encryption was enabled and a temporary identifier was assigned to the UE for subsequent communications over the air interface.

Unfortunately, the initial openness of the permanent identity of the UE became a target for malicious actors to gain unauthorized access to the mobile network. Accordingly, for 5G networks, the $3^{RD}$ Generation Partnership Project (3GPP) has mandated the concealment of identities of UEs by introducing a concealed identity referred to as a Subscription Concealed Identifier (SUCI).

Given the identity concealment and use of different identities on different interfaces of a 5G network, maintaining subscriber state in a stateless network architecture of a 5G network may be very challenging.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1C an illustrative representation of a Next Generation (NG) interface protocol architecture of the 5G network which makes use of an NG Application Protocol (NGAP);

FIGS. 5A-5F are call flow diagrams of call flows for processing messages at one or more network nodes (e.g. of an AMF) in the 5G network and, in particular, associated with a registration procedure of a UE in the 5G network;

FIG. 6 is an illustrative conceptual diagram showing an example of a server selection mechanism based on a hash function.

DESCRIPTION OF EXAMPLE EMBODIMENTS

Figure 1A:
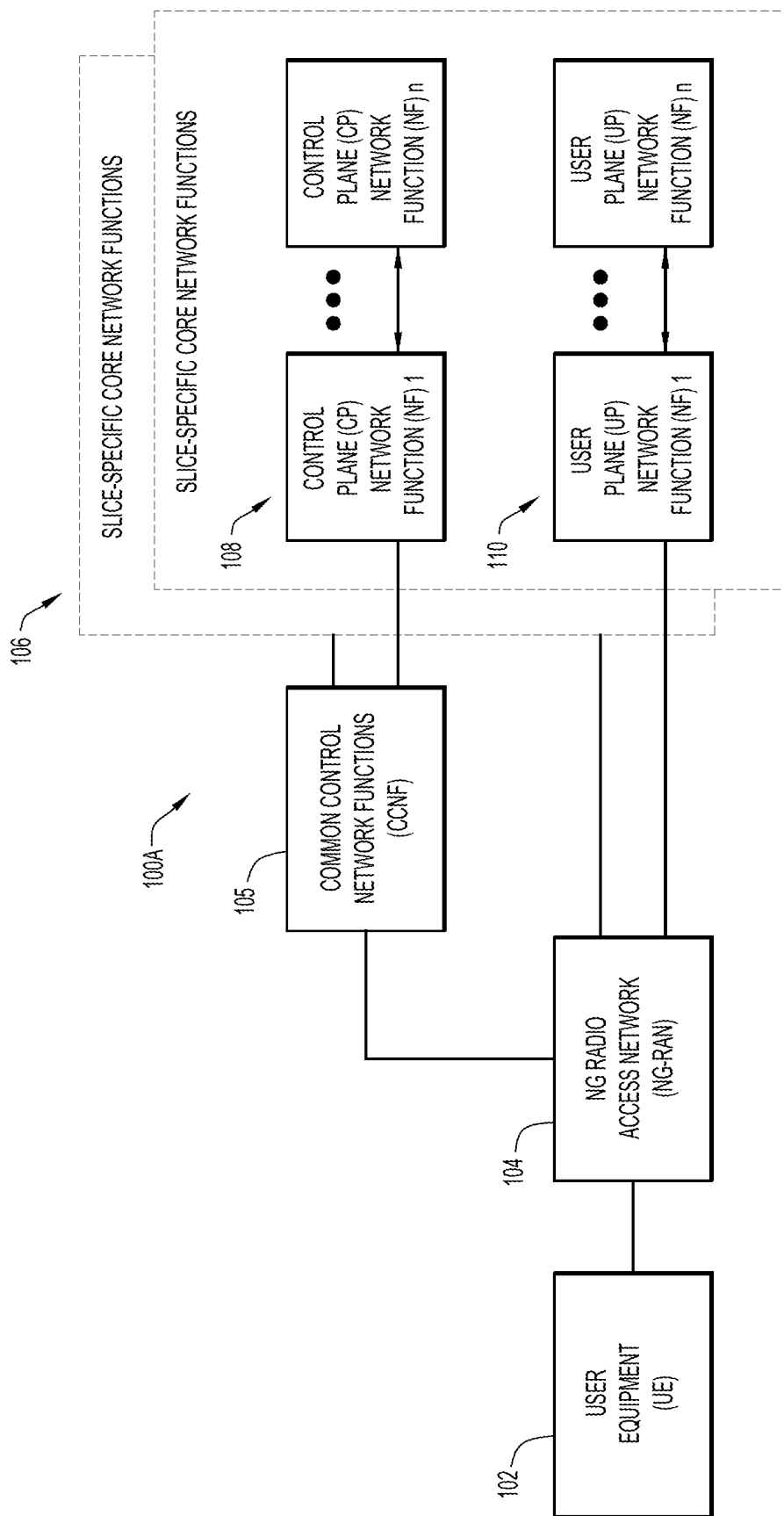
FIG. 1A is an illustrative representation of a general network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Fifth Generation (5G) standards specify use of a Subscription Concealed Identifier (SUCI) (i.e. a concealed identity) for a user equipment (UE) during initial registration in a 5G network. The SUCI may be derived from a Subscription Permanent Identifier (SUPI) (i.e. a permanent identity) of the UE, which is typically based on an International Mobile Subscriber Identity (IMSI) stored in a Subscriber Identity Module (SIM) of the UE. Given the identity concealment and use of different identities on different interfaces of the 5G network, maintaining subscriber state with a stateless network architecture of the 5G network may be challenging.

Accordingly, one or more techniques and mechanisms are provided herein for subscriber management with a stateless network architecture in a 5G network. The techniques and associated mechanisms of the present disclosure may be provided at one or more network nodes comprising a network function (NF) of a 5G network, and especially an Access and Mobility Management Function (AMF) of the 5G network. The one or more network nodes comprising the AMF may be configured for managing communications associated with a UE operative in a Next Generation (NG) Radio Access Network (RAN) (NG-RAN), and for communicating signaling messages with the NG-RAN according to an NG Application Protocol (NGAP). The AMF may include a set of AMF servers and a server selector configured to select an AMF server to which to forward incoming signaling messages for processing.

In one illustrative example of the inventive techniques, a registration request message which includes a SUCI associated with the UE may be received. An initial AMF server to which to forward the registration request message for processing may be identified from a set of AMF servers of the AMF. A context of a subscriber session of the UE may be stored in a local data store of the initial AMF server. A first AMF-UE-NGAP-ID for NGAP messaging associated with the UE may be allocated, which includes at least embedding in the first AMF-UE-NGAP-ID a hash result of a hash performed on an initial server ID of the initial AMF server. Accordingly, when receiving an NGAP message which includes the first AMF-UE-NGAP-ID, the initial AMF server to which to forward the received NGAP message for processing may be selected from the set of AMF servers, based on the hash result of the initial server ID extracted from the first AMF-UE-NGAP-ID in the NGAP message.

Subsequently, a SUPI associated with the UE may be received from an authentication procedure performed for the UE based on the SUCI. An anchor AMF server for the UE may be identified from the set of AMF servers based on a hash result of a hash performed on the SUPI of the UE. The context of the subscriber session of the UE may be forwarded from the initial AMF server to the anchor AMF server and stored in a local data store of the anchor AMF server. A second AMF-UE-NGAP-ID for NGAP messages associated with the UE may be allocated, which includes at least embedding in the second AMF-UE-NGAP-ID a hash result of a hash performed on an anchor server ID of the anchor AMF server. Accordingly, when receiving an NGAP message which includes the second AMF-UE-NGAP-ID, the anchor AMF server to which to forward the received NGAP message for processing may be selected from the set of AMF servers, based on the hash result of the anchor server ID extracted from the second AMF-UE-NGAP-ID in the NGAP message.

In another illustrative example of the inventive techniques, an anchor AMF server for the UE may be identified from a set of AMF servers of the AMF, based on a hash result of a hash performed on a SUPI of the UE according to a hash function. An AMF-UE-NGAP-ID for NGAP messages associated with the UE may be allocated, which includes at least embedding in the AMF-UE-NGAP-ID a hash result of a hash performed on an anchor server ID of the anchor AMF server. Accordingly, when receiving an NGAP message which includes the AMF-UE-NGAP-ID over an NG interface, the anchor AMF server to which to forward the received NGAP message for processing may be selected from the set of AMF servers, based on the hash result of the anchor server ID extracted from the AMF-UE-NGAP-ID in the NGAP message. On the other hand, when receiving a signaling message which includes the SUPI of the UE over an interface different from the NG interface (e.g. an N11 interface or Service Based Interface or "SBI"), the anchor AMF server to which to forward the received signaling message for processing may be selected from the set of AMF servers, based on a hash result of a hash performed on the SUPI in the signaling message according to the hash function.

Prior to the above processing, a registration request message which includes a SUCI associated with the UE may be received. An initial AMF server to which to forward the registration request message for processing may be identified from the set of AMF servers. An initially-allocated AMF-UE-NGAP-ID for NGAP messages associated with the UE may be allocated, which includes at least embedding in the initially-allocated AMF-UE-NGAP-ID a hash of an initial server ID of the initial AMF server. Accordingly, when receiving an NGAP message which includes the initially-allocated AMF-UE-NGAP-ID over the NG interface, the initial AMF server to which to forward the received NGAP message for processing may be selected from the set of AMF servers, based on the hash result of the initial server ID extracted from the initially-allocated AMF-UE-NGAP-ID in the NGAP message.

More detailed and alternative techniques and implementations are provided herein as described below.

EXAMPLE EMBODIMENTS

In a mobile network, a network function for processing a set of related tasks may be implemented with and distributed over a set of servers, one of which may be selected for processing an incoming message from or for a given user equipment (UE). The server may be selected by a server selector which may be or include a load balancer or load balancing function. Messages associated with a UE that require processing in the mobile network (e.g. by a network function or server) may be communicated over various interfaces of the mobile network. The UE may be identified in such messaging using one or more temporary user identifiers. These temporary user identifiers may include a General Packet Radio Service (GPRS) Tunneling Protocol (GTP) tunnel identifier or Tunnel Endpoint Identifier (TEID), an S1-Application Protocol (S1-AP) ID, a Temporary Mobile Subscriber Identity (TMSI), a Globally Unique Temporary Identity (GUTI), and others.

When a stateful network architecture in the mobile network is employed, a server identifier which identifies the server that maintains a subscriber state of the UE may be embedded in the temporary user identifier of the UE. Here, a server selector may identify the server identifier from the temporary user identifier in the incoming message so that it may properly route the message to a selected (appropriate) one of the servers for processing. One the other hand, when a stateless network architecture is employed, intermediate states of the UE may be kept in external data stores so that any one of the servers may process subscriber-related events at any given time. This approach may be relatively expensive, however, especially in call setup procedures where setup time is critical, as each event may necessitate an update to an external data store. A semi-stateful approach is another approach that may be taken. When a semi-stateful architecture is employed, an intermediate state of the UE may be kept in the server locally during the duration of a procedure and then updated in an external data store at the end of the procedure.

Prior to the advent of Fifth Generation (5G) standards from the $3^{RD}$ Generation Partnership Project (3GPP), the UE of a subscriber was required to reveal its permanent identity (i.e. its SUPI) "in the clear" over an air interface of the mobile network during a registration procedure. Once the subscriber was authenticated, encryption was enabled and a temporary user identifier was assigned for subsequent communications over the air interface. Unfortunately, the initial openness of the permanent identity of the UE became a target for malicious actors to gain unauthorized access to the mobile network. Accordingly, for 5G networks, the 3GPP has mandated the concealment of identities of UEs by introducing a concealed identity, referred to as a SUCI, which may be derived from the permanent identity or SUPI.

It would be advantageous to facilitate a stateless network architecture in a Fifth Generation (5G) network. Given the concealed identity and the use of different identities on different interfaces of the 5G network, however, maintaining subscriber state with a stateless network architecture in a 5G network may be challenging.

To better explain in relation to the figures, FIG. 1A is an illustrative representation of a general network architecture 100A of a 5G network. Network architecture 100A includes common control network functions (CCNF) 105 and a plurality of slice-specific core network functions 106. With network architecture 100A, the 5G network may be configured to facilitate communications for a user equipment (UE) 102. UE 102 may obtain network access via a (radio) access network (R)AN or a Next Generation (NG) RAN (NG-RAN) 104. NG-RAN 104 may include one or more base stations, gNBs (such as a gNB 107), or ng-eNBs. UE 102 may be any suitable type of device, such as a cellular telephone, a smart phone, a tablet device, an Internet of Things (IoT) device, a machine-to-machine (M2M) device, and a sensor, to name but a few.

Notably, the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services. Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of functionalities provided by CCNF 105.

On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
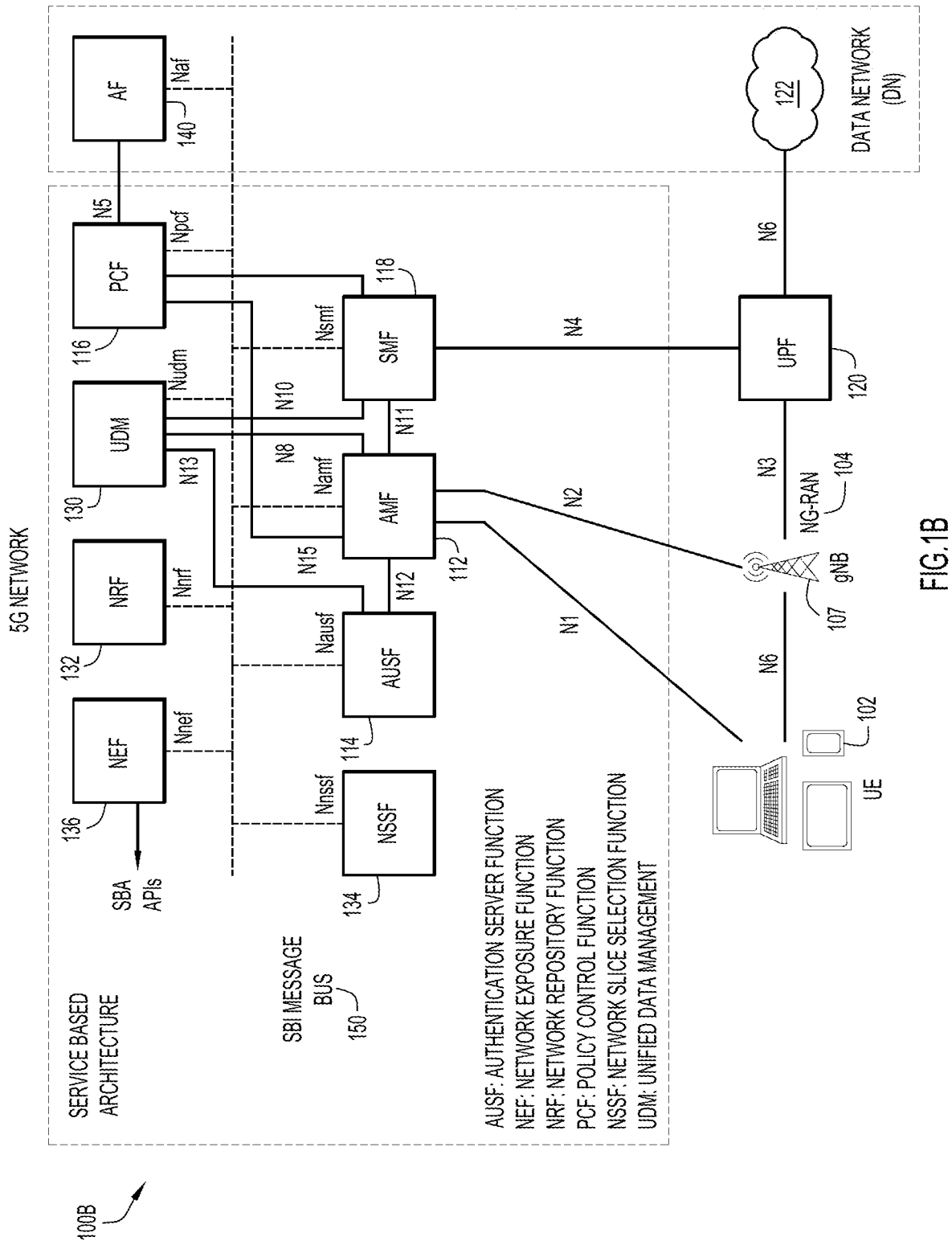
FIG. 1B is an illustrative representation of a more detailed network architecture of the 5G network of FIG. 1A.

FIG. 1B is an illustrative representation of a more detailed network architecture 100B of the 5G network of FIG. 1A. As provided in 3GPP standards for 5G (e.g. 3GPP Technical Specifications or "TS" 23.501 and 23.502), network architecture 100B of the 5G network may include an AMF 112, an authentication server function (AUSF) 114, a policy control function (PCF) 116, an SMF 118, and a UPF 120 which may connect to a data network (DN) 122. Other NFs in the 5G network include an NSSF 134, a network exposure function (NEF) 136, a network function (NF) repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and most if not all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, where the control plane functionality and common data repositories are provided with use of the set of interconnected NFs, each with authorization to access each other's services. With the SBA, each NF service may expose its functionality through a Service Based Interface (SBI) message bus 150. SBI message bus 150 may employ a Representational State Transfer (REST) interface (e.g. using Hypertext Transfer Protocol or "HTTP"/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140. Assuming the role of either service consumer or service producer, NFs may be self-contained, independent and reusable.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

One or more application functions, such as an application function (AF) 140 may connect to the 5G network, for example, via PCF 116. AF 140 may interact with the network via NEF 136 in order to access network capabilities. NEF 136 may securely expose network capabilities and events provided by NFs to AF 140, and may provide a means for AF 140 to securely provide information to the 5G network.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

NRF 132 may maintain NF profiles of available NF instances and their associated services, and support a service discovery function for service discovery associated with the NF profiles. NF profiles of NF instances maintained in NRF 132 may include NF instance ID, NF type, network slice identifiers such as NSI ID, NF capacity information, names of supported services, etc. For service discovery, NRF 132 may receive a discovery request from an NF instance and provide information associated with the discovered NF instance to the NF instance in response.

AMF 112 may receive all connection and session related information from UE 102 via NG-RAN 104, and may be operative to handle connection and mobility management tasks. On the other hand, most or all messages related to session management may be forwarded over the N11 reference interface to SMF 118. SMF 118 is primarily responsible for interacting with the decoupled data plane, creating updating and removing Protocol Data Unit (PDU) sessions and managing session context with UPF 120. Typically, AMF 112 may query NRF 132 to discover and select available SMF instances. An SMF instance may be identified by an IP address or a Fully Qualified Domain Name (FQDN).

An NG Application Protocol (NGAP) may be employed to carry Non-Access Stratum (NAS) messages across an NG interface for communication between NG-RAN 104 and AMF 112. The NGAP is defined in telecommunications standards, which include "5G; NG-RAN; NG Application Protocol (NGAP)," 3GPP Technical Specification (TS) 38.413, version 15.4.0, Release 15, 16 Jul. 2019, as well as more generally in 3GPP TS 38.410. NGAP procedures may include procedures for PDU session management, UE context management, UE mobility management, paging, and interface management. Using the NGAP, AMF 112 may receive requests to process tasks associated with connection or mobility management, while forwarding session management requirements over the N11 interface to SMF 118.

With reference to FIG. 1C, an illustrative representation of an NG interface protocol architecture 100C of the 5G network is shown. NG interface protocol architecture 100C includes an NG user plane interface (NG-U) 151 and an NG control plane interface (NG-C) 151. An NG-U protocol stack 152 of NG-U 151 may include, from bottom to top, a physical layer, a data link layer, an IP layer, a User Data Protocol (UDP) layer, and a GTP—U layer. As illustrated, GTP-U may be used on top of UDP and IP to carry user plane PDUs 154 between NG-RAN 104 and UPF 120 (FIG. 1B). Also as indicated in FIG. 1C, NG-C 161 may be defined between NG-RAN 104 and AMF 112 (again FIG. 1B). An NG-C protocol stack 162 of NG-C 161 may include, from bottom to top, a physical layer, a data link layer, an IP layer, and a Stream Control Transmission Protocol (SCTP) layer. SCTP may be added on top of IP for a reliable transport of signaling messages. For transport, an IP layer point-to-point transmission may be used to deliver signaling PDUs. As indicated in FIG. 1C, an NGAP 164 may be used as an application layer signaling protocol for NG-C 161.

Figure 2:
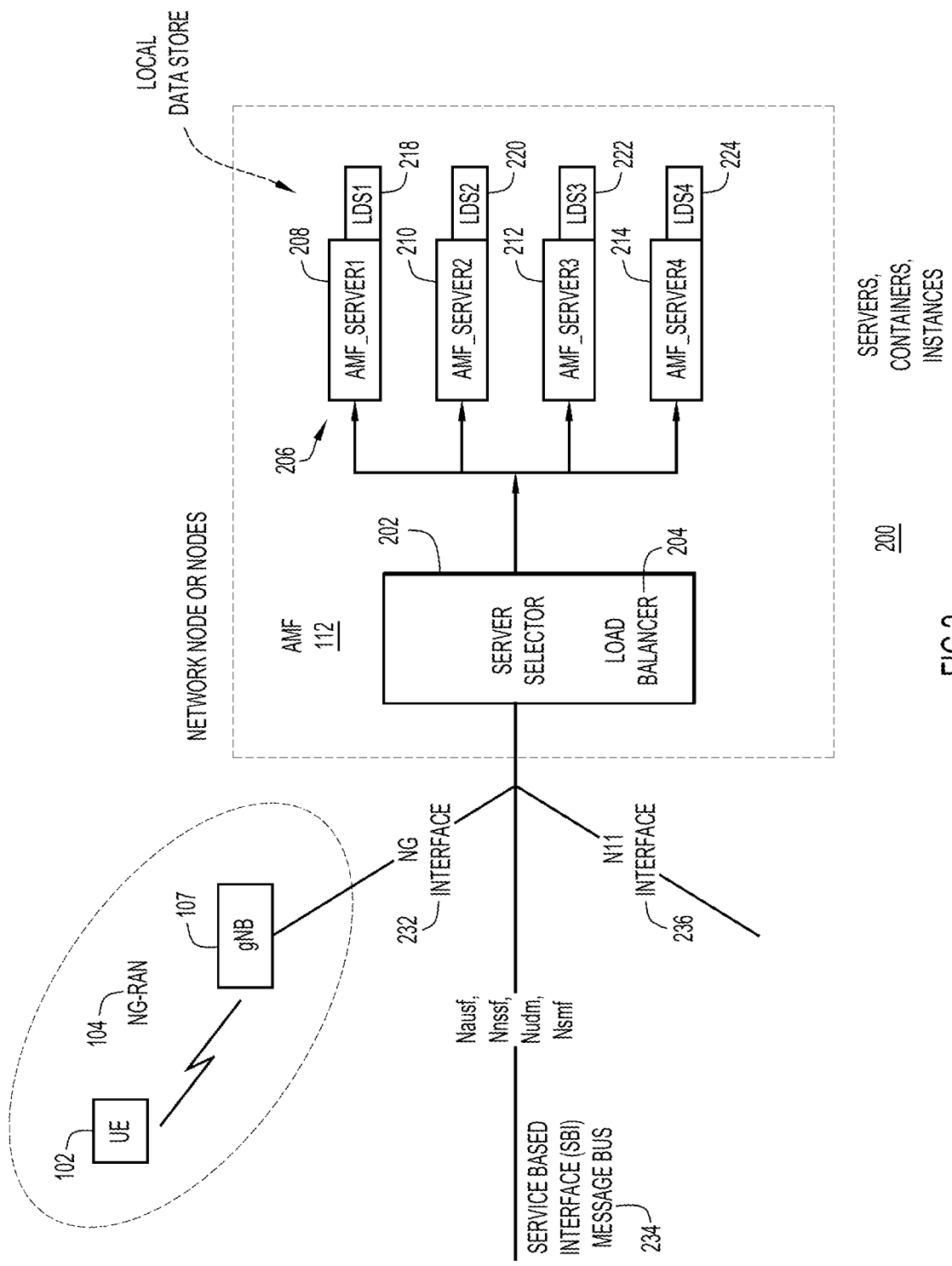
FIG. 2 is a block diagram of a system which includes one or more network nodes of an Access and Mobility Management Function (AMF) in the 5G network according to some implementations of the present disclosure.

FIG. 2 is a block diagram of a system 200 which includes one or more network nodes of AMF 112. The one or more network nodes of AMF 112 may include a server selector 202 and a set of AMF servers 206. The set of AMF servers 206 may be a related and/or collocated set of servers for AMF 112. Also, the set of AMF servers 206 may be or include a set of servers (e.g. computer programs or devices), containers, or instances. Signaling messages may be communicated over various interfaces in the 5G network, such as an NG interface 232, an SBI message bus interface 234, or an N1 interface 236. Server selector 202 may operate to select, from the set of AMF servers 206, an AMF server to which to forward an incoming signaling message for processing. For this purpose, server selector 202 may include a load balancing function or a load balancer 204. In some implementations and in some cases, server selection may be facilitated using a server selection mechanism which is based on a hash function, an example of which is shown and described later below in relation to FIG. 6.

As illustrated in FIG. 2, the set of AMF servers 206 include an AMF server 208 ("AMF_SERVER1"), an AMF server 210 ("AMF_SERVER2"), an AMF server 212 ("AMF_SERVER3"), and an AMF server 214 ("AMF_SERVER4"). Each one of AMF servers 206 may include a local data store ("LDS" in the figure). As illustrated in FIG. 2, AMF server 208 may include a local data store 218 ("LDS1"), AMF server 210 may include a local data store 220 ("LDS2"), AMF server 212 may include a local data store 222 ("LDS3"), and AMF server 214 may include a local data store 224 ("LDS4"). Although four (4) AMF servers are shown in the illustrative example, any suitable number of servers may be employed.

Each server in the set of AMF servers 206 may be or include the same or substantially the same functionality as the other. The primary tasks or functions of an AMF as described in 3GPP specifications include registration management, connection management, reachability management, mobility management, and various function relating to security and access management and authorization. The one or more network nodes of AMF 112 may include one or more of these primary tasks or functions, including at least registration management.

Thus, AMF 112 may perform a set of tasks relating to a registration procedure for UE 102 (e.g. initial registration). Per NGAP signaling, a "RAN-UE-NGAP-ID" may be allocated or generated so as to uniquely identify UE 102 over NG interface 232 within NG-RAN 104 or gNB 107. When AMF 112 receives an RAN-UE-NGAP-ID, it may store it for the duration of a UE-associated logical NG-connection for UE 102. Once known to AMF 112, the RAN-UE-NGAP-ID may be included in most or all UE-associated NGAP signaling. The RAN-UE-NGAP-ID may be unique within a logical NG-RAN node. Similarly, an "AMF-UE-NGAP-ID" may be allocated or generated (e.g. by AMF 112) so as to uniquely identify UE 102 over NG interface 232 within AMF 112. When a NG-RAN node receives an AMF-UE-NGAP-ID it may store it for the duration of the UE-associated logical NG-connection for UE 102. Once known to a NG-RAN node, the AMF-UE-NGAP-ID may be included in most or all UE-associated NGAP signaling. The AMF-UE-NGAP-ID may be unique within an AMF logical node.

According to at least some implementations, one or more techniques and associated mechanisms are provided for subscriber management with a stateless network architecture in a 5G network. The one or more techniques and mechanisms may be provided in relation to one or more network nodes of an AMF, and in particular, in relation to a registration procedure between the UE and the AMF. More specifically, the present techniques and associated mechanisms may be associated and used in connection with a call flow described in Section 4.2.2.2.2 (FIG. 4.2.2.2.2-1: Registration procedure) of the 3GPP Technical Specification (TS) 23.502 (e.g. version 15.2.0, Release 15) (2018-06), albeit configured for a stateless network architecture according to at least some implementations of the present disclosure.

Figure 3A:
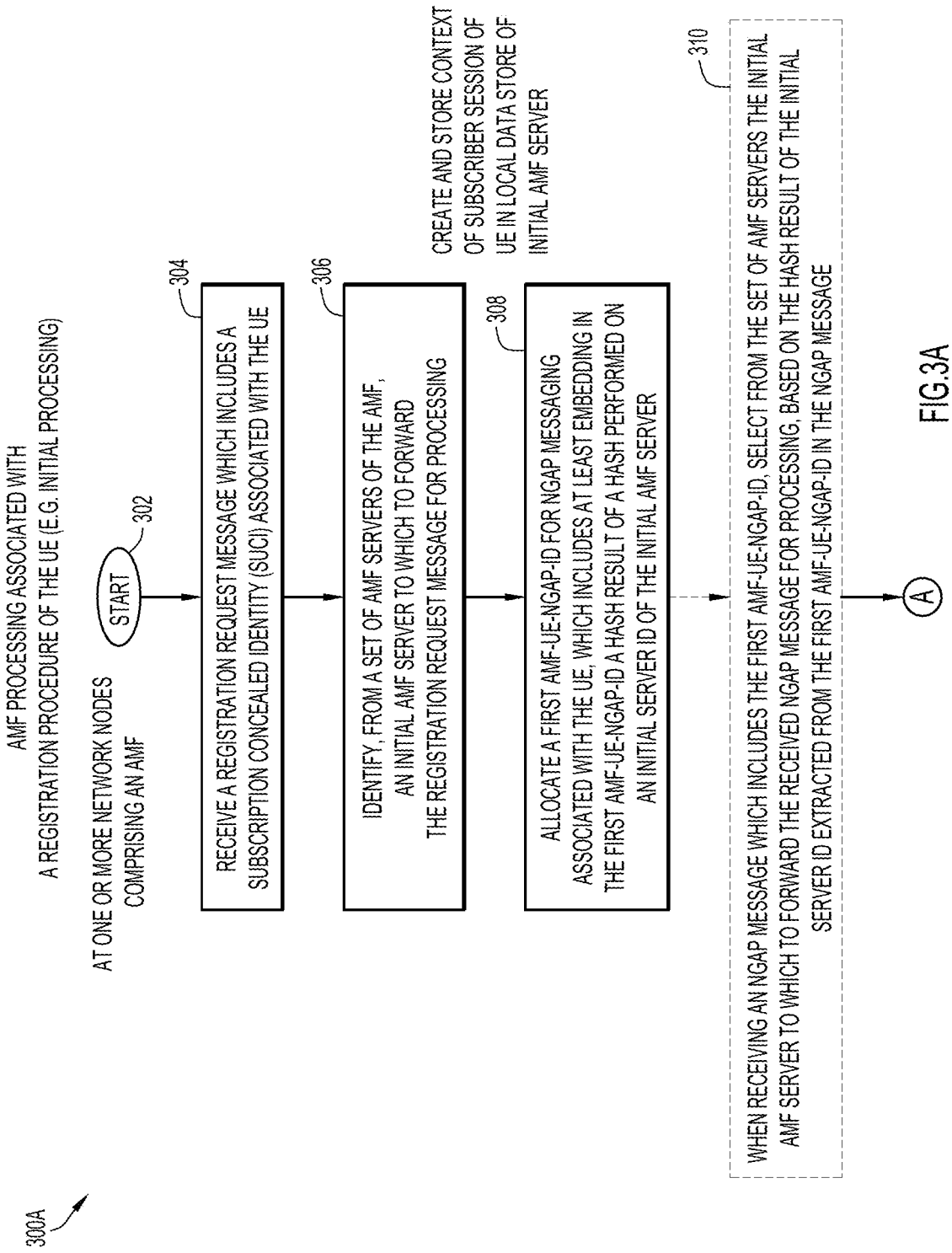
FIG. 3A is a flowchart for describing a method for use in processing messages at one or more network nodes (e.g. of an AMF) in the 5G network according to some implementations of the present disclosure, which may be particularly related to a registration procedure of a user equipment (UE) in the 5G network.

Referring now to FIG. 3A, a flowchart 300A of a method for use in processing messages at one or more network nodes of a 5G network according to some implementations of the present disclosure, which may be related to a registration procedure of a UE, is shown. In particular, the method may be performed at one or more network nodes of an AMF in a 5G network. The AMF may be configured for managing communications associated with a UE operative in a NG-RAN, and for communicating signaling messages with the NG-RAN according to an NGAP. In at least some implementations, the method may facilitate a stateless network architecture for the AMF in the 5G network. The method may be embodied as a computer program product including a non-transitory computer readable medium and instructions stored in the computer readable medium, where the instructions are executable on one or more processors of the one or more network nodes for performing the steps of the method. The one or more network nodes of the AMF may include a set of AMF servers and a server selector configured to select an AMF server to which to forward incoming signaling messages for processing. In some implementations and in some cases, server selection may be facilitated with use of a server selection mechanism which is based on a hash function, an example of which is shown and described later in relation to FIG. 6.

Beginning at a start block 302 of FIG. 3A, a registration request message which includes a SUCI associated with the UE may be received (step 304 of FIG. 3A). The registration request message may be an Initial UE message received from the gNB. An initial AMF server to which to forward the registration request message for processing may be identified from a set of AMF servers of the AMF (step 306 of FIG. 3A). Here, a context of a subscriber session of the UE may be created and stored in a local data store of the initial AMF server. A first AMF-UE-NGAP-ID for NGAP messaging associated with the UE may be allocated, which includes at least embedding in the first AMF-UE-NGAP-ID a hash result of a hash performed on an initial server ID of the initial AMF server (step 308 of FIG. 3A). In some implementations of step 306, the server selector may identify the initial AMF server, and the initial AMF server may perform the hash on the initial server ID for allocating the first AMF-UE-NGAP-ID in step 308. The first AMF-UE-NGAP-ID may be referred to as an initially-allocated AMF-UE-NGAP-ID.

Accordingly, when receiving an NGAP message which includes the first AMF-UE-NGAP-ID, the initial AMF server to which to forward the received NGAP message for processing may be selected (e.g. by the server selector) from the set of AMF servers, based on the hash result of the initial server ID extracted from the first AMF-UE-NGAP-ID in the NGAP message (step 310 of FIG. 3A).

Figure 3B:
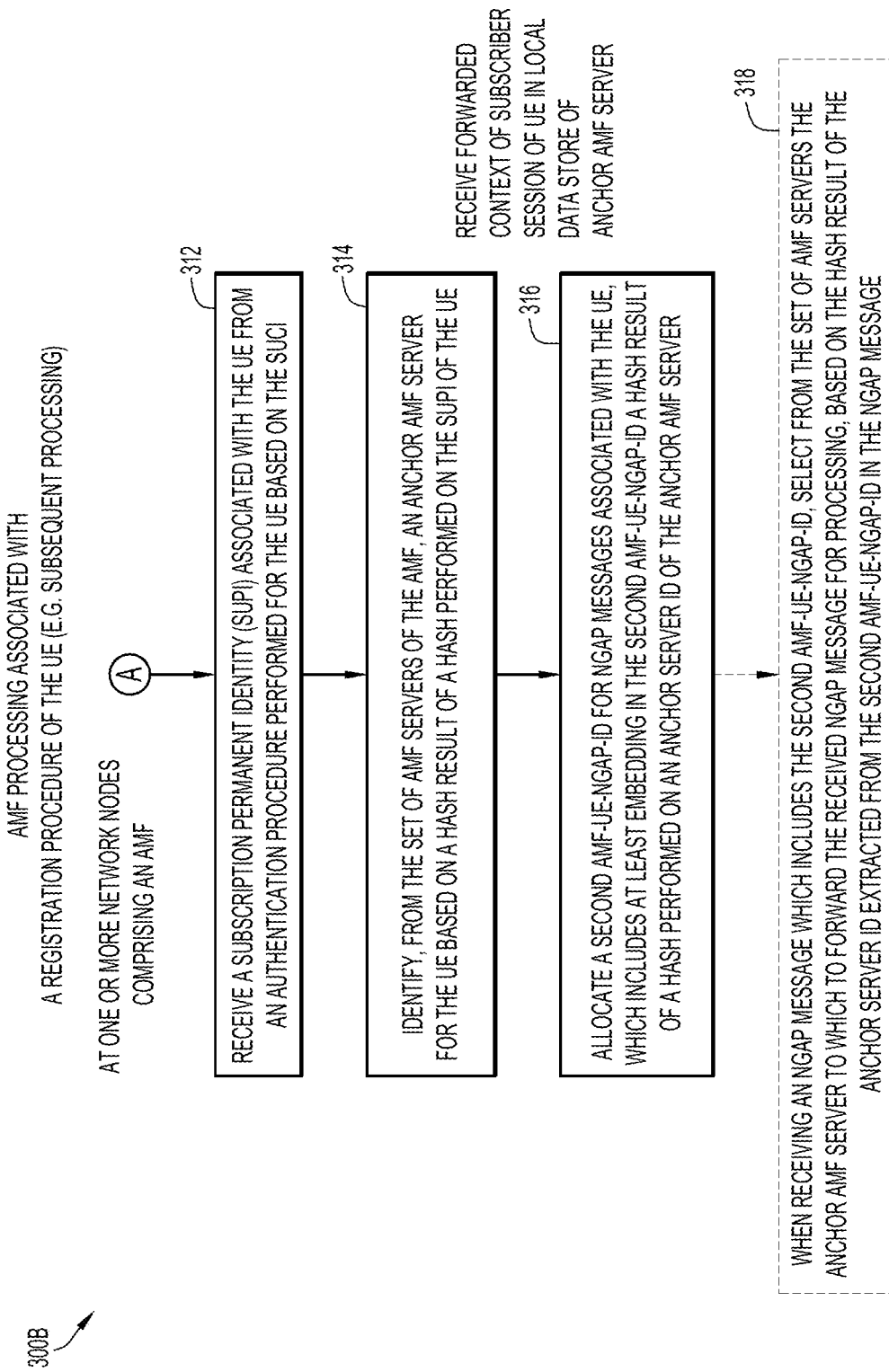
FIG. 3B is a flowchart for describing a method for use in processing messages at one or more network nodes (e.g. of an AMF) in the 5G network according to some implementations of the present disclosure, which may be particularly related to the registration procedure of the UE in the 5G network, and which may be a continuation of the method described in relation to FIG. 3A.

The method may be continued in a flowchart 300B of FIG. 3B through a connector "A." A SUPI associated with the UE may be received from an authentication procedure performed for the UE (step 312 of FIG. 3B). The authentication procedure may be performed by the initial AMF server for the UE based on its SUCI. For example, at the initial AMF server, the authentication procedure may be performed for the UE at least in part by sending to an authentication function (e.g. AUSF 114 of FIG. 1B) an authentication request which includes the SUCI of the UE, and receiving from the authentication function an authentication response which includes the SUPI of the UE. In many cases, the SUPI is an International Mobile Subscriber Identity (IMSI).

After the SUPI is obtained, an anchor AMF server for the UE may be identified from the set of AMF servers based on a hash result of a hash performed on the SUPI of the UE (step 314 of FIG. 3B). Here, the context of the subscriber session of the UE may be forwarded from the initial AMF server to the anchor AMF server and stored in a local data store of the anchor AMF server. A second AMF-UE-NGAP-ID for NGAP messages associated with the UE may be allocated, which includes at least embedding in the second AMF-UE-NGAP-ID a hash result of a hash performed on an anchor server ID of the anchor AMF server (step 316 of FIG. 3B). In some implementations of step 314, the initial AMF server may identify the anchor AMF server, and the anchor AMF server may perform the hash on the anchor server ID for allocating the second AMF-UE-NGAP-ID in step 316. The second AMF-UE-NGAP-ID may be referred to as a subsequently-allocated AMF-UE-NGAP-ID.

Accordingly, when receiving an NGAP message which includes the second AMF-UE-NGAP-ID, the anchor AMF server to which to forward the received NGAP message for processing may be selected (e.g. by the server selector) from the set of AMF servers, based on the hash result of the anchor server ID extracted from the second AMF-UE-NGAP-ID in the NGAP message (step 318 of FIG. 3B).

The one or more network nodes of the AMF may receive other types of messages over different interfaces of the 5G network. For example, the one or more network nodes of the AMF may receive signaling messages which include the SUPI of the UE over an interface such as the N11 interface or the SBI. Accordingly, in some implementations, when receiving a signaling message which includes the SUPI of the UE over such an interface, the anchor AMF server to which to forward the received signaling message for processing may be selected from the set of AMF servers, based on a hash result of a hash performed on the SUPI in the signaling message. In these implementations, the server selector may identify the SUPI from the signaling message and perform a hash on the SUPI for selecting the (e.g. appropriate, same) anchor AMF server for processing.

In some implementations of step 306 of FIG. 3A, the initial AMF server may be identified by randomly selecting the initial AMF server from the set of AMF servers. The load balancer of the server selector may be utilized for this purpose. In other implementations of step 306 of FIG. 3A, the initial AMF server may be identified by selecting the initial AMF server based on the SUCI of the UE or, more particularly, based on a hash result of a hash performed on the SUCI of the UE. In these implementations, an incoming signaling message which includes the SUCI may be received, where the server selector may identify the SUCI from the signaling message and perform a hash on the SUCI for selecting the (appropriate, same) initial AMF server for processing.

In some implementations of step 310 of FIG. 3A, one type of NGAP message which includes the first AMF-UE-NGAP-ID may be an authentication response from the NG-RAN which is received in response to an authentication request for the authentication procedure for the UE. Another type of the NGAP message which includes the first AMF-UE-NGAP-ID may be an initial context setup response from the NG-RAN which is received in response to an initial context setup request. In some implementations of step 318 of FIG. 3B, one type of NGAP message which includes the second AMF-UE-NGAP-ID may be a PDU session establishment request.

In some implementations, after allocating the first AMF-UE-NGAP-ID for NGAP messaging associated with the UE in step 308 of FIG. 3A, the AMF may send to the NG-RAN a message comprising an initial context setup request which includes the first AMF-UE-NGAP-ID. In response, the AMF may receive from the NG-RAN a message indicating an initial context setup response which includes the first AMF-UE-NGAP-ID. In some implementations, after allocating the second AMF-UE-NGAP-ID for NGAP messaging associated with the UE in step 316 of FIG. 3B, the AMF may send to the NG-RAN a message indicating a UE context modification request which includes the second AMF-UE-NGAP-ID. In response, the AMF may receive from the NG-RAN a message indicating a UE context modification response which includes the second AMF-UE-NGAP-ID.

Figure 4A:
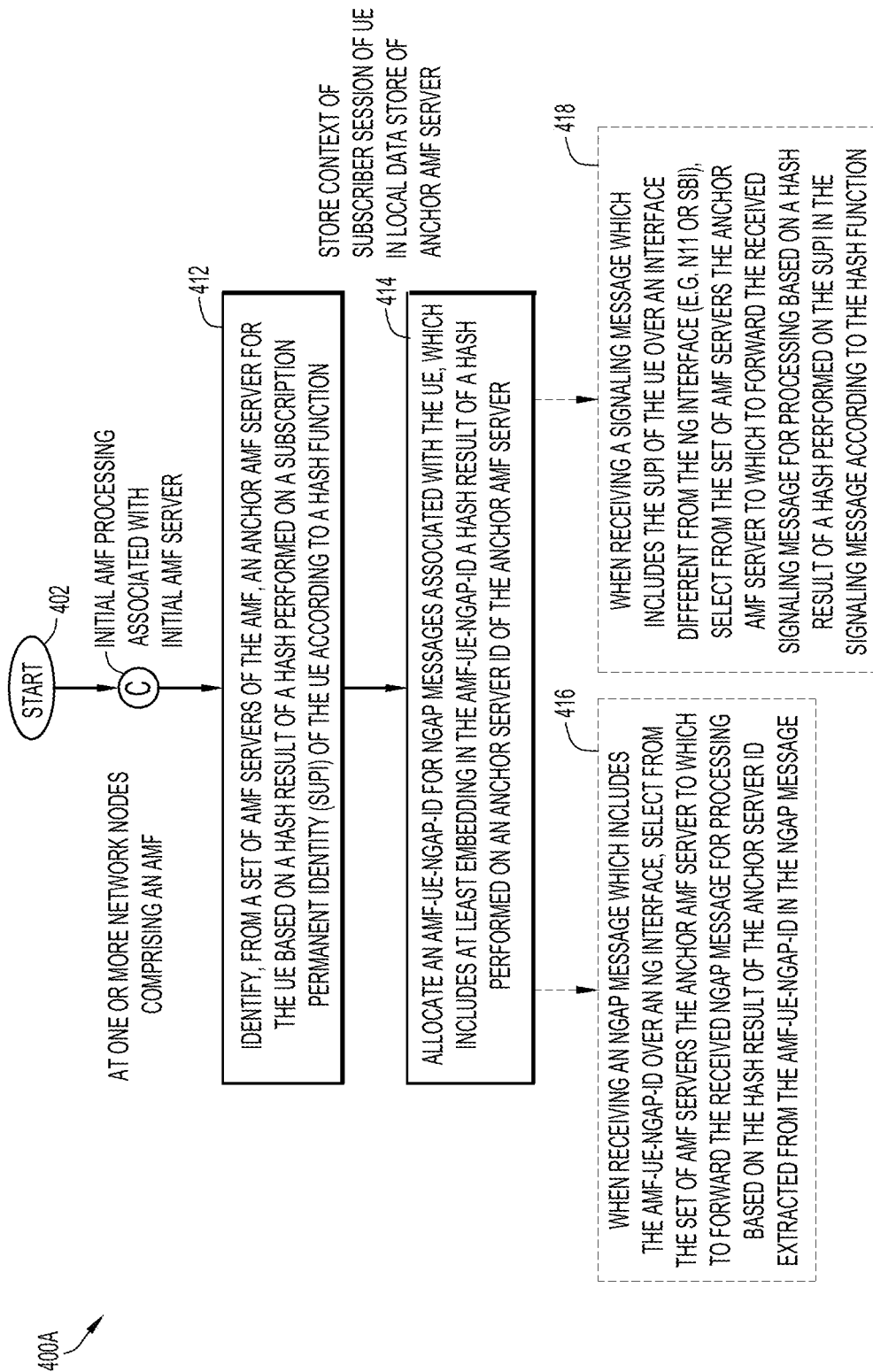
FIG. 4A is a flowchart for describing a method for use in processing messages at one or more network nodes (e.g. of an AMF) in the 5G network according to some implementations of the present disclosure, which may be particularly related to the registration procedure of the UE in the 5G network.

Referring now to FIG. 4A, a flowchart 400A of a method for use in processing messages at one or more network nodes of a 5G network according to some implementations of the present disclosure, which may be related to a registration procedure of a UE, is shown. In particular, the method may be performed at one or more network nodes of an AMF in a 5G network. Again, the AMF may be configured for managing communications associated with a UE operative in a NG-RAN, and for communicating signaling messages with the NG-RAN according to an NGAP. In at least some implementations, the method may facilitate a stateless network architecture for the AMF in the 5G network. The method may be embodied as a computer program product including a non-transitory computer readable medium and instructions stored in the computer readable medium, where the instructions are executable on one or more processors of the one or more network nodes for performing the steps of the method. The one or more network nodes of the AMF may include a set of AMF servers and a server selector configured to select an AMF server to which to forward incoming signaling messages for processing. In some implementations and in some cases, server selection may be facilitated with use of a server selection mechanism which is based on a hash function, an example of which is shown and described later in relation to FIG. 6.

Beginning at a start block 402 of FIG. 4A, initial processing for registration associated with an initial AMF server of the AMF is performed as identified by a connector "C," which is described later in relation to FIG. 4B. After such initial processing, an anchor AMF server for the UE may be identified from a set of AMF servers of the AMF based on a hash result of a hash performed on a SUPI of the UE according to a hash function (step 412 of FIG. 4A). The context of the subscriber session of the UE may be stored in a local data store of the anchor AMF server (e.g. where the context may have been forwarded and received from the initial AMF server). An AMF-UE-NGAP-ID for NGAP messages associated with the UE may be allocated, which includes at least embedding in the AMF-UE-NGAP-ID a hash result of a hash performed on an anchor server ID of the anchor AMF server (step 414 of FIG. 4A). In these implementations, the server selector may identify the SUPI from the signaling message and perform a hash on the SUPI for selecting the (e.g. appropriate, same) anchor AMF server for processing.

Accordingly, when receiving an NGAP message which includes the AMF-UE-NGAP-ID over an NG interface, the anchor AMF server to which to forward the received NGAP message for processing may be selected from the set of AMF servers, based on the hash result of the anchor server ID extracted from the AMF-UE-NGAP-ID in the NGAP message (step 416 of FIG. 4A). In some implementations, the server selector may identify the hash result from the NGAP message and select the (e.g. appropriate, same) anchor AMF server for processing based on the hash result.

Further accordingly, when receiving a signaling message which includes the SUPI of the UE over an interface different from the NG interface (e.g. an N11 interface, or SBI), the anchor AMF server to which to forward the received signaling message for processing may be selected from the set of AMF servers based on a hash result of a hash performed on the SUPI in the signaling message according to the hash function (step 418 of FIG. 4A). In some implementations, the server selector may identify the SUPI from the receiving signaling message and perform a hash on the SUPI for selecting the (e.g. appropriate, same) anchor AMF server for processing.

Figure 4B:
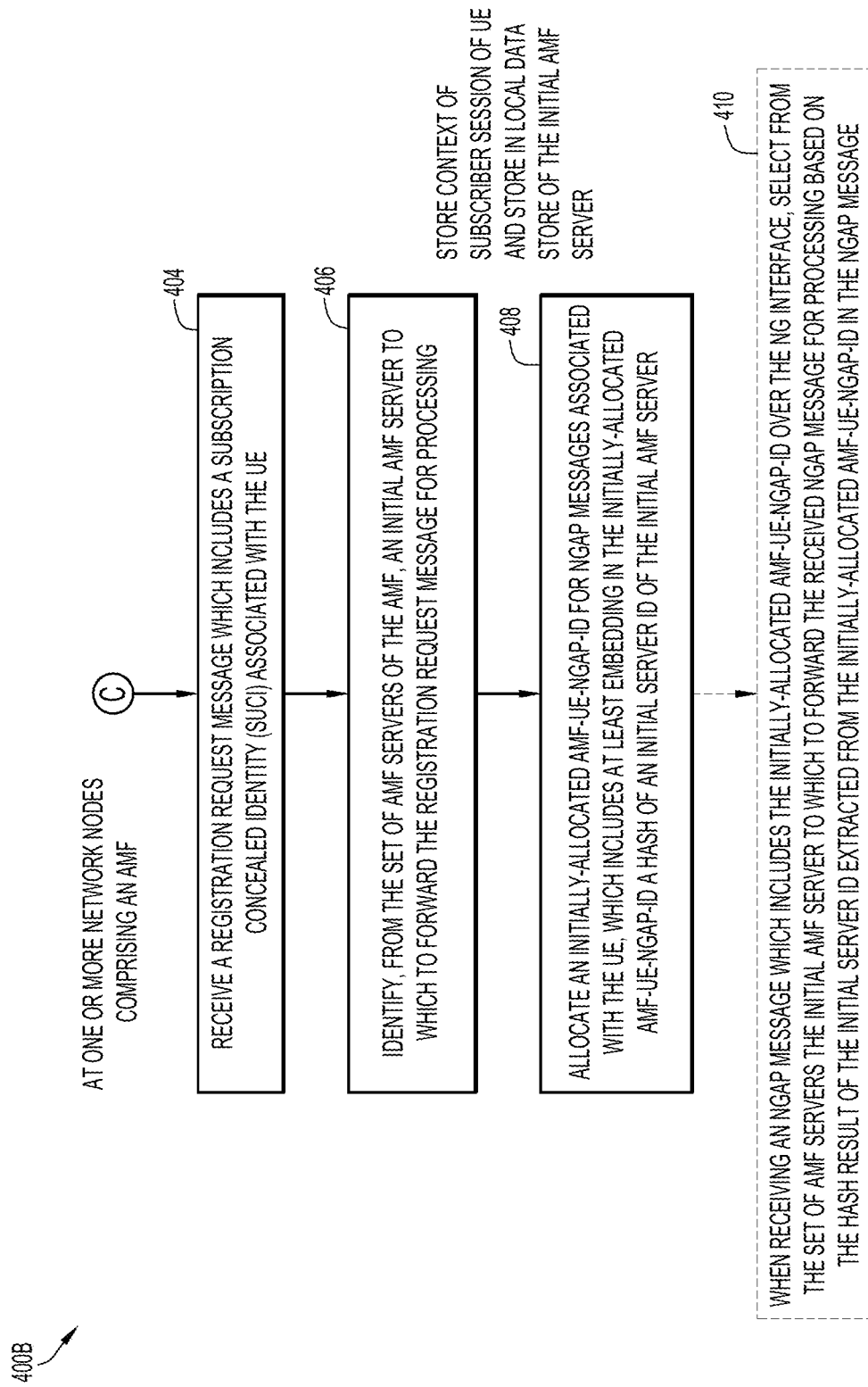
FIG. 4B is a flowchart for describing a method for use in processing messages at one or more network nodes (e.g. of an AMF) in the 5G network according to some implementations of the present disclosure, which may be particularly related to the registration procedure of the UE in the 5G network, and which may be a continuation of the method described in relation to FIG. 4A.

The method of FIG. 4A may be preceded by the method in a flowchart 400B of FIG. 4B via the connector "C." In FIG. 4B, a registration request message which includes a SUCI associated with the UE may be received (step 404 of FIG. 4B). The registration request message may be an Initial UE message received from the gNB. An initial AMF server to which to forward the registration request message for processing may be identified from the set of AMF servers (step 406 of FIG. 4B). An initially-allocated AMF-UE-NGAP-ID for NGAP messages associated with the UE may be allocated, which includes at least embedding in the initially-allocated AMF-UE-NGAP-ID a hash of an initial server ID of the initial AMF server (step 408 of FIG. 4B). As is apparent, this initially-allocated AMF-UE-NGAP-ID is different from the AMF-UE-NGAP-ID, which may be referred to as a subsequently-allocated AMF-UE-NGAP-ID.

Accordingly, when receiving an NGAP message which includes the initially-allocated AMF-UE-NGAP-ID over the NG interface, the initial AMF server to which to forward the received NGAP message for processing may be selected from the set of AMF servers based on the hash result of the initial server ID extracted from the initially-allocated AMF-UE-NGAP-ID in the NGAP message (step 410 of FIG. 4B). In some implementations, the server selector may identify the hash result from the NGAP message and select the (e.g. appropriate, same) initial AMF server for processing based on the hash result.

FIGS. 5A-5F are call flow diagrams 500A-500F of call flows for processing messages at one or more network nodes (e.g. of an AMF) of a 5G network according to some implementations of the present disclosure. The call flows of FIGS. 5A-5F are associated with a registration procedure of a UE in a 5G network (e.g. FIGS. 1A-1C). In at least some implementations, the processes in the call flows may facilitate a stateless network architecture (e.g. of an AMF) in the 5G network. The processes of these call flows may be considered to be a more specific implementation of and end-to-end solution for the registration procedure than that described in relation to the flowchart of FIGS. 3A-3B and 4A-4B. The processes in the call flows may be embodied as a computer program product including a non-transitory computer readable medium and instructions stored in the computer readable medium, where the instructions are executable on one or more processors of one or more network nodes for performing the steps of the method. The one or more network nodes of the AMF may include a set of AMF servers and a server selector configured to select an AMF server to which to forward incoming signaling messages for processing (see e.g. FIG. 2). In some implementations and in some cases, AMF server selection may be facilitated with use of a server selection mechanism which is based on a hash function, an example of which is shown and described later in relation to FIG. 6.

Figure 5A:
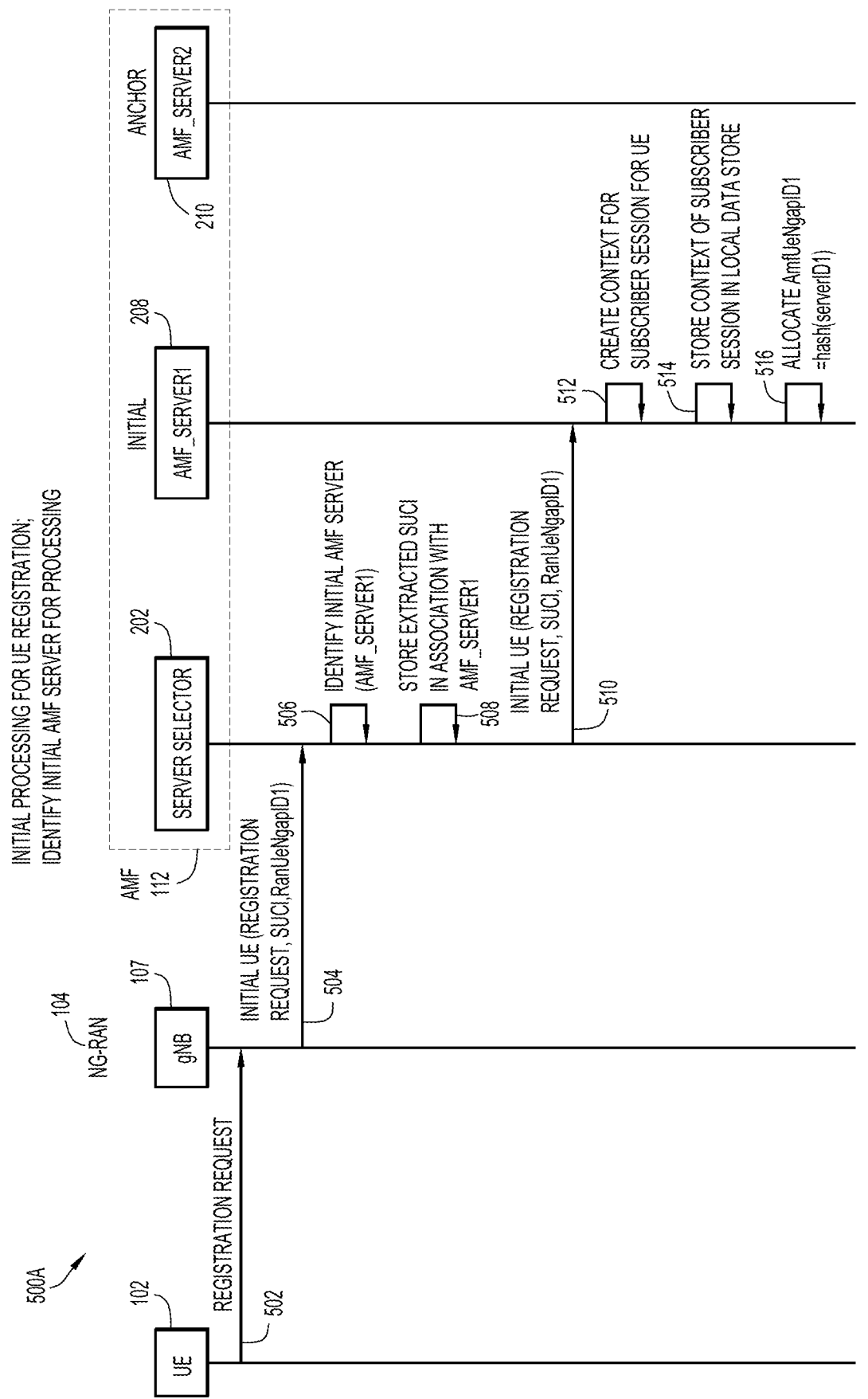

In FIG. 5A, what is shown is a call flow diagram 500A relating to a call flow for initial processing for initial registration for a UE. In general, UE 102 and/or gNB 107 may employ the NGAP with AMF 112 to carry NAS messages across the appropriate reference interfaces. As indicated in FIG. 5A, UE 102 may send to gNB 107 a message indicating a registration request (step 502 of FIG. 5A). In response, gNB 107 may send to AMF 112 an Initial UE message which includes the registration request, the SUCI of UE 102, and a RAN-UE-NGAP-ID1 (step 504 of FIG. 5B). Server selector 202 of AMF 112 may receive the Initial UE message and, in response, identify an initial AMF server to which to forward the message for processing (step 506 of FIG. 5A). Here, as indicated in the illustrated example, server selector 202 may select AMF server 208 (i.e. AMF_SERVER1) as the initial AMF server.

In step 506, server selector 202 may select the (initial) AMF server 208 by randomly selecting one of the servers of the set. The SUCI of UE 102 may then be stored in association with an identification of the (initial) AMF server 208 (step 508 of FIG. 5A). This stored association may be performed to enable appropriate server selection for any subsequently incoming signaling messages which include the same SUCI. In alternative implementations of step 506, server selector 202 may select the (initial) AMF server 208 based on the SUCI or based on a hash result of a hash performed on the SUCI of UE 102. This alternative implementation may likewise be performed to enable appropriate server selection for any subsequently incoming signaling messages which include the same SUCI.

Server selector 202 may forward the Initial UE message to the selected (initial) AMF server 208 for processing (step 510 of FIG. 5A). At the (initial) AMF server 208, a context for a subscriber session may be created for UE 102 (step 512 of FIG. 5A). The context for the subscriber session may be stored in a local data store of the (initial) AMF server 208 (step 514 of FIG. 5A). For example, see the local data store 218 of FIG. 2.

The (initial) AMF server 208 may allocate an AMF-UE-NGAP-ID which is indicated in the figure as AMF-UE-NGAP-ID1 (step 516 of FIG. 5A). The (initial) AMF server 208 may allocate the AMF-UE-NGAP-ID1 by identifying a server ID (e.g. serverID1 or an "initial server ID") of the (initial) AMF server 208, performing a hash on the server ID, and embedding in the AMF-UE-NGAP-ID1 a hash result of the hash performed on the server ID. This AMF-UE-NGAP-ID1 may be referred to as an initially-allocated AMF-UE-NGAP-1D.

An authentication procedure for UE 102 may then be initiated by AMF 112. Continuing with call flow diagram 500B of FIG. 5B, a procedure between AMF 112 and AUSF 114 (i.e. the authentication function) for authentication of UE 102 based on the SUCI is illustrated. In this procedure, AMF 112 may obtain the SUPI of the UE based on the SUCI of the UE. The (initial) AMF server 208 of AMF 112 may send to AUSF 116 a message which indicates an Nausf_UEAuthenticate_authenticate request and includes the SUCI of the UE (step 518 of FIG. 5B). In response, AUSF 114 may receive the message from the (initial) AMF server 208 and, in turn, may send to UDM 130 a message which indicates an Nudm_UEAuthenticate GetRequest and includes the SUCI of the UE (step 520 of FIG. 5B). In response, UDM 130 may receive the message from the AUSF 114 and, in turn, send back to AUSF 116 a message which indicates an Nudm_UEAuthenticate GetResponse and includes an associated authentication method and data (step 522 of FIG. 5B). In response, AUSF 114 may receive the message from UDM 130 and, in turn, send to the (initial) AMF server 208 a message which indicates an Nausf_UEAuthenticate_authenticate Response and includes the SUPI of the UE (step 524 of FIG. 5B). The (initial) AMF server 208 may receive the message from AUSF 114, and may store the SUPI of the UE in association with the context of the subscriber session of the UE (step 526 of FIG. 5B).

Figure 5B:
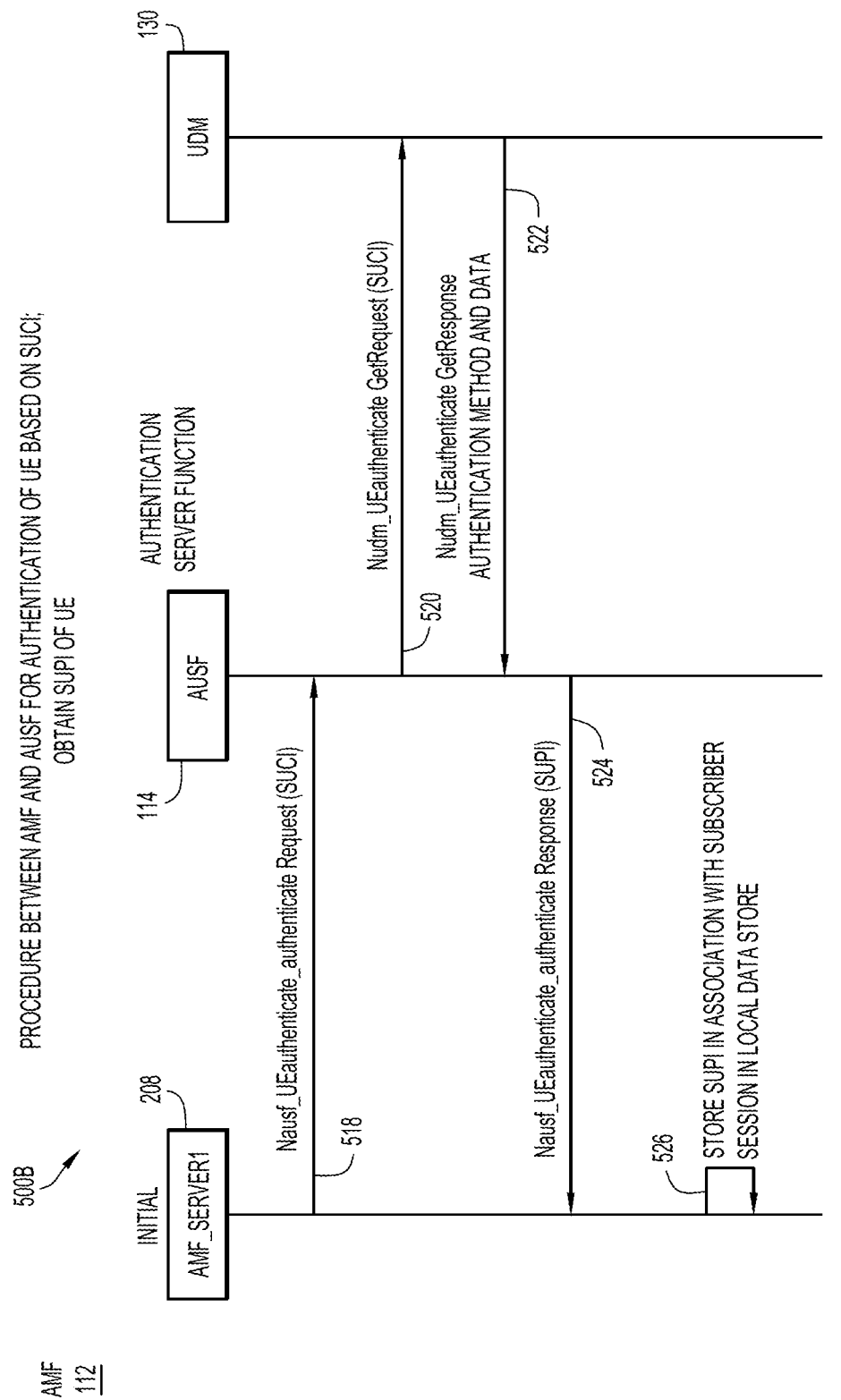
Figure 5C:
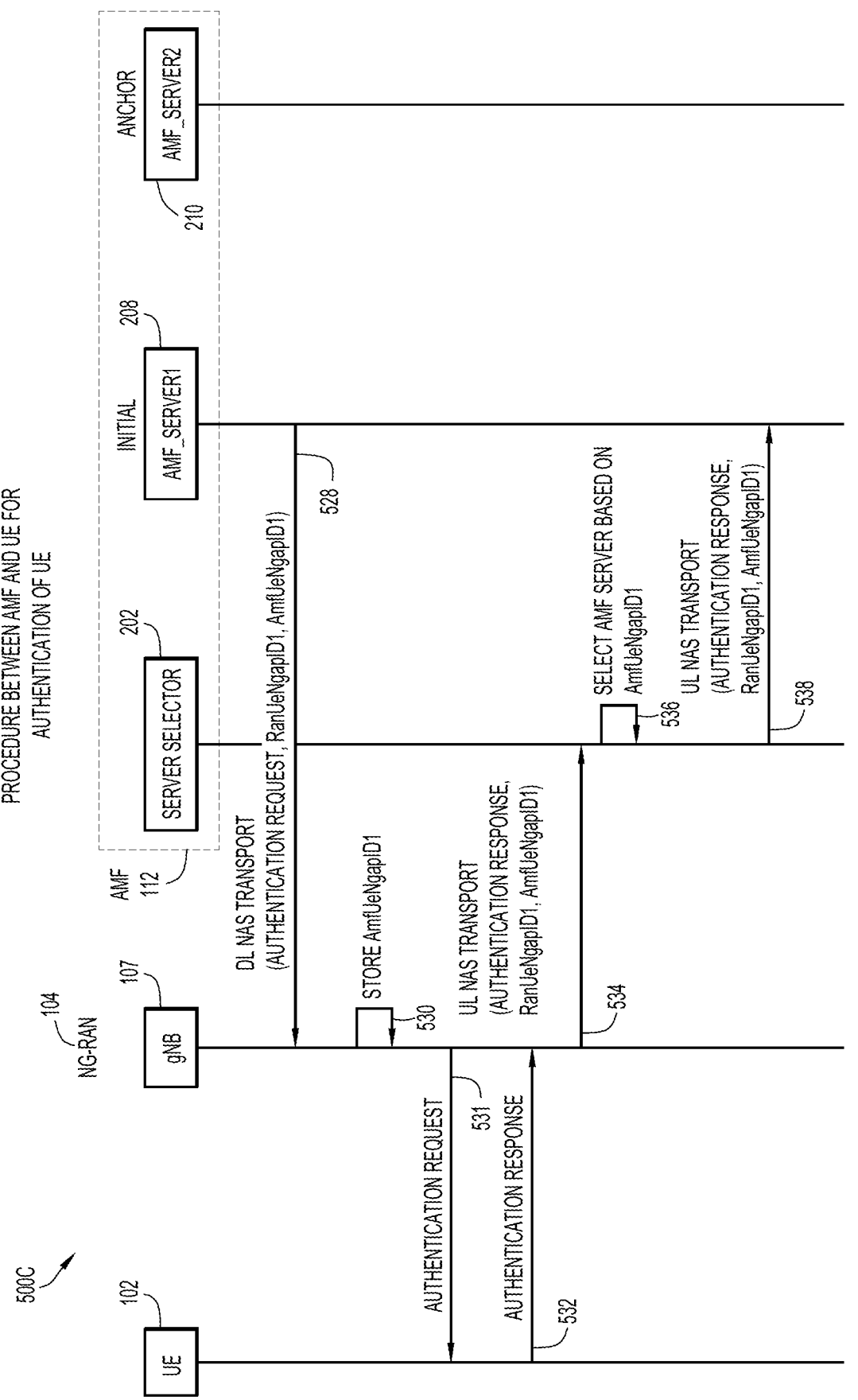

The authentication procedure for UE 102 may be continued in call flow diagram 500C of FIG. 5C. After receipt of the response from the AUSF, the (initial) AMF server 208 may send to gNB 107 a message which is a downlink (DL) NAS transport message which indicates an Authentication Request and includes the RAN-UE-NGAP-ID1 and the AMF-UE-NGAP-ID1 (step 528 of FIG. 5C). In response, the gNB 107 may receive the message from the (initial) AMF server 208 and store AMF-UE-NGAP-ID1 (step 530 of FIG. 5C). Further, the gNB 107 may forward the authentication request to UE 102 (step 531 of FIG. 5C) and receive from UE 102 an authentication response (step 532 of FIG. 5C). The gNB 107 may send to AMF 112 a message which is an uplink (UL) NAS transport message which indicates an Authentication Response and includes the RAN-UE-NGAP-ID1 and the AMF-UE-NGAP ID1 (step 534 of FIG. 5C). Server selector 202 of AMF 112 may receive the message from gNB 107 and perform server selection for processing. More specifically, server selector 202 may select the (initial) AMF server 208 from the set of servers based on the hash result of the server ID extracted from the AMF-UE-NGAP-ID1 in the message (step 536 of FIG. 5C). Server selector 202 may then forward the message (i.e. the UL NAS transport message which indicates the Authentication Response) to the (initial) AMF server 208 for processing (step 538 of FIG. 5C).

Figure 5D:
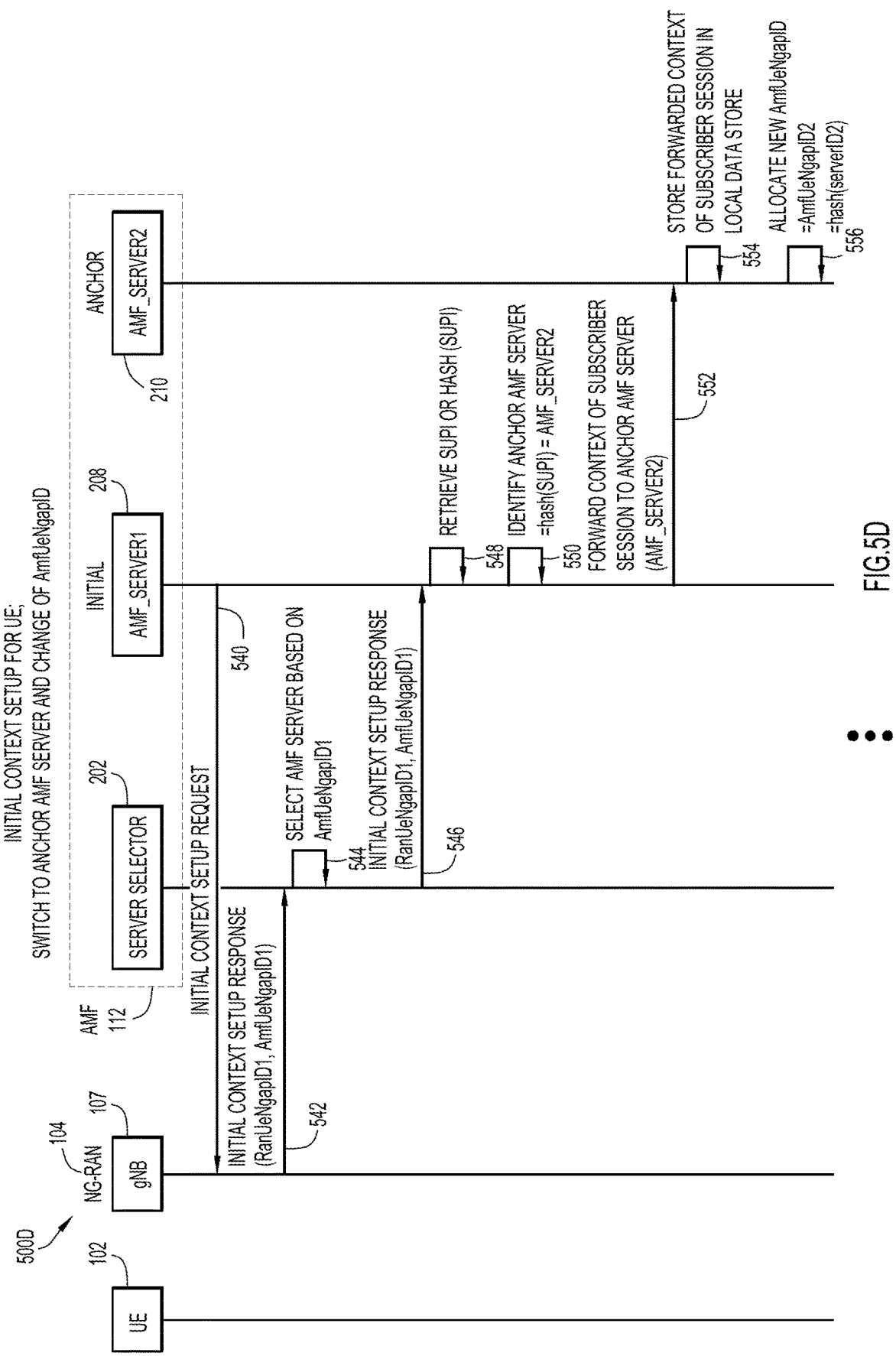

Continuing with call flow diagram 500D of FIG. 5D, a procedure for an initial context setup for UE 102 is illustrated. This procedure may immediately follow that described in relation to FIG. 5C. In FIG. 5D, the (initial) AMF server 208 may send to gNB 107 a message which indicates an Initial Context setup request (step 540 of FIG. 5D). The gNB 107 may receive the message from the (initial) AMF server 208 and setup a context for the subscriber session for UE 102. The gNB 107 may send back to AMF 112 a message which indicates an Initial Context setup response and includes the RAN-UE-NGAP-ID1 and the AMF-UE-NGAP-ID1 (step 542 of FIG. 5D). Server selector 202 may receive the message from gNB 107 and perform server selection for processing. More specifically, server selector 202 may again select the (initial) AMF server 208 from the set of servers based on the hash result of the server ID extracted from the AMF-UE-NGAP-ID1 in the message (step 544 of FIG. 5D). Server selector 202 may then forward the message (i.e. the message which indicates an Initial Context setup request) to the (initial) AMF server 208 for processing (step 546 of FIG. 5D). The (initial) AMF server 208 may receive the forwarded message from the server selector 202.

The (initial) AMF server 208 may retrieve the SUPI of UE 102 or a hash of the SUPI of UE 102 (e.g. previously obtained and stored in relation to step 526 of FIG. 5B) (step 548 of FIG. 5D). The (initial) AMF server 208 may proceed to change the server for processing. The (initial) AMF server 208 may identify from the set of AMF servers an anchor AMF server for processing. More specifically, the (initial) AMF server 208 may identify the anchor AMF server for UE 102 based on a hash result of a hash performed on the SUPI of UE 102 (step 550 of FIG. 5D). Here, as indicated in the illustrated example, the (initial) AMF server 208 may select AMF server 210 (i.e. AMF_SERVER2) as the anchor AMF server. The (initial) AMF server 208 may then forward the context of the subscriber session of UE 102 to the (anchor) AMF server 210, and perform any other related tasks for the change (step 552 of FIG. 5D).

The (anchor) AMF server 210 may receive the forwarded context of the subscriber session from the (initial) AMF server 208 and store the forwarded context in a local data store (step 554 of FIG. 5D). For example, see local data store 220 of FIG. 2. The (anchor) AMF server 210 may allocate a new or updated AMF-UE-NGAP-1D which is indicated in the figure as AMF-UE-NGAP-ID2 (step 556 of FIG. 5D). The (anchor) AMF server 210 may allocate the AMF-UE-NGAP-ID2 by identifying a server ID (e.g. serverID2 or an "anchor server ID") of the (anchor) AMF server 210, performing a hash on the server ID, and embedding in the AMF-UE-NGAP-ID2 a hash result of the hash performed on the server ID. The AMF-UE-NGAP-ID2 may be referred to as a subsequently-allocated AMF-UE-NGAP-ID.

Figure 5E:
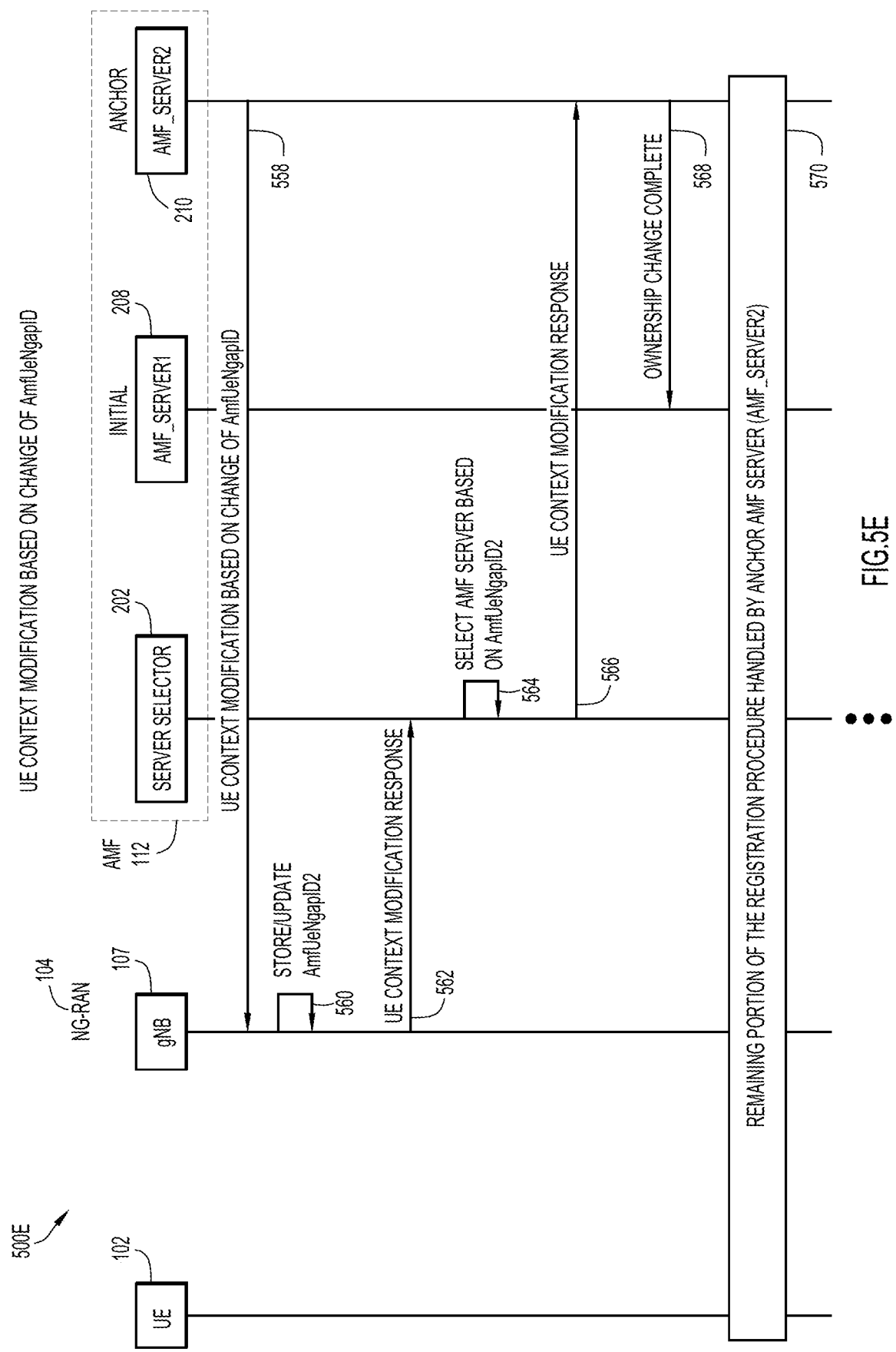

Continuing with call flow diagram 500E of FIG. 5E, a procedure for UE context modification is shown. This procedure may immediately follow that described in relation to FIG. 5D. In FIG. 5E, the (anchor) AMF server 210 may send to gNB 107 a message which indicates a UE Context modification request (step 558 of FIG. 5E). The message may include the RAN-UE-NGAP-ID1, the AMF-UE-NGAP-ID1, and the AMF-UE-NGAP-1D-2 (step 558 of FIG. 5E). The gNB 107 may receive the message from the (anchor) AMF server 210 and store or update the AMF-UE-NGAP-1D to AMF-UE-NGAP-ID2 (step 560 of FIG. 5E). The gNB 107 may then send back to AMF 112 a message which indicates a UE Context modification response (step 562 of FIG. 5E). Server selector 202 of AMF 112 may receive the message from gNB 107 and perform server selection for processing. More specifically, server selector 202 may select the (anchor) AMF server 210 from the set of servers based on the hash result of the server ID extracted from the AMF-UE-NGAP-ID2 in the message (step 564 of FIG. 5E). Server selector 202 may then forward the message to the (anchor) AMF server 210 for processing (step 566 of FIG. 5E). The (anchor) AMF server 210 may receive the forwarded message from the server selector 202 for processing. The (anchor) AMF server 210 may send to the (initial) AMF server 208 a message indicating that ownership change is complete (step 568 of FIG. 5E). A remaining portion of the registration procedure and subsequent procedures may be performed (e.g. in relation to the anchor AMF server) (step 570 of FIG. 5E).

Continuing with the call flow diagram 500F of FIG. 5F, example messaging and processing associated with AMF 112 is shown. Such example messaging and processing may be performed, for example, after the procedures described above. In FIG. 5F, UE 102 may send to gNB 107 a message which indicates a PDU session establishment request (step 572 of FIG. 5F). The gNB 107 may receive and forward this message to AMF 112 (step 574 of FIG. 5F). Server selector 202 of AMF 112 may receive the message from gNB 107 and perform server selection for processing. More specifically, server selector 202 may select the (anchor) AMF server 210 from the set of servers based on the hash result of the server ID extracted from the AMF-UE-NGAP-ID2 in the message (step 576 of FIG. 5F). Server selector 202 may then forward the message which indicates the PDU session establishment request to the (anchor) AMF server 210 for processing (step 578 of FIG. 5E). The (anchor) AMF server 210 may receive the forwarded message from the server selector 202 for processing the PDU session establishment request.

Further in FIG. 5F, SMF 118 may send to AMF 112 a signaling message over the N11 interface (not NGAP signaling) (step 580 of FIG. 5F). This signaling message may include the SUPI of UE 102. Server selector 202 of AMF 112 may receive the signaling message, identify the SUPI from the signaling message, perform a hash on the SUPI, and select the (anchor) AMF server 210 to which to forward the signaling message for processing (step 582 of FIG. 5F).

Server selector 202 may forwarding the signaling message to the (anchor) AMF server 210 (step 584 of FIG. 5F). The (anchor) AMF server 210 may receive the forwarded signaling message from the server selector 202 and process it accordingly.

As is apparent, when receiving an NGAP message which includes an AMF-UE-NGAP-ID over an NG interface, an anchor AMF server to which to forward the received NGAP message for processing may be selected from a set of AMF servers based on the hash result of the anchor server ID extracted from the AMF-UE-NGAP-1D in the NGAP message. Further, when receiving a signaling message which includes the SUPI of the UE over an interface that is different from the NG interface (e.g. N11 or SBI), the anchor AMF server to which to forward the received signaling message for processing may be selected from the set of AMF servers based on a hash result of a hash performed on the SUPI in the signaling message according to the hash function.

FIG. 6 is a conceptual diagram showing an example of a server selection mechanism 600 which is based on a hash function 602 shown for illustrative clarity. Such server selection mechanism 600 may be used by a server selector (e.g. server selector 202 of FIG. 2) according to some implementations. Hash function 602 may operate on a SUPI from an incoming signaling message. In the illustrative conceptual example, given four (4) servers of the AMF (e.g. AMF servers 208, 210, 212, and 214 of FIG. 2), hash function 602 of server selection mechanism 600 may be configured such that any given SUPI input results in a hash result of either 1, 2, 3, or 4 which corresponds to a selected one of AMF servers 208, 210, 212, or 214.

Figure 7:
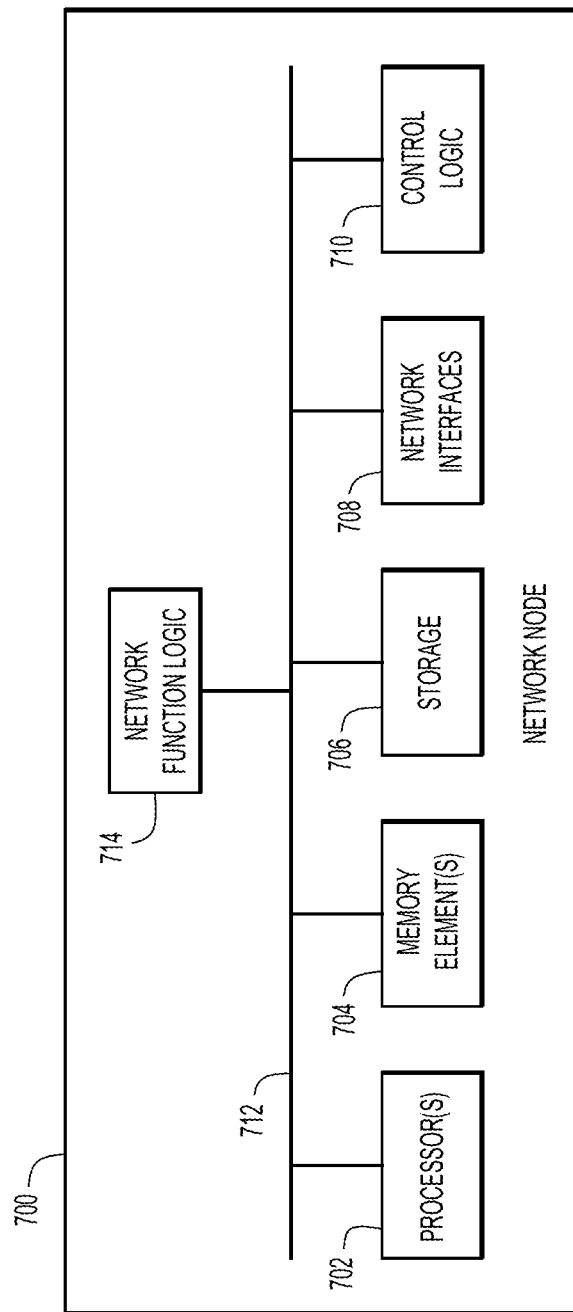
FIG. 7 illustrates a block diagram of a network node (e.g. of a network function or "NF" such as an AMF) configured to perform operations according to some implementations.

FIG. 7 is a simplified block diagram illustrating example details that may be associated with a network node 700 (or e.g. a compute or computing node) for an NF, such as an AMF, in accordance with some implementations associated with the system 200 of FIG. 2 (e.g. in the context of the 5G network of FIGS. 1B-1C) and associated techniques and mechanism described herein. In various embodiments, network element functionality may be performed using any combination of network nodes. In some implementations, network node 700 may be implemented as a data center network node such as a server, rack of servers, multiple racks of servers, etc. for a data center; or a cloud (or microcloud) network node, which may be distributed across one or more data centers.

In some implementations, network node 700 may one or more processors 702, one or more memory elements 704, storage 706, network interfaces 708, control logic 710 and network function logic 714. In some implementations, the processors 702 are at least one hardware processor configured to execute various tasks, operations and/or functions for network node 700 as described herein according to software and/or instructions configured for the network node 700. In some implementations, memory elements 704 and/or storage 706 are configured to store data, information, software, instructions, logic (e.g. any logic 710 and/or 714), data structures, combinations thereof, or the like for various implementations described herein. Note that in some implementations, storage may be consolidated with memory elements (or vice versa), or may overlap/exist in any other suitable manner.

In some implementations, network interfaces 708 enable communication between for network node 700 and other network elements, systems, slices, etc. that may be present in the system to facilitate operations as discussed for various embodiments described herein. In some implementations, network interfaces 708 may include one or more Ethernet drivers and/or controllers, Fibre Channel drivers, and/or controllers, or other similar network interface drivers and/or controllers to enable communications for network node 700 within the system.

In some implementations, control logic 710 may include instructions that, when executed (e.g. via processors 702), cause network node 700 to perform operations, which may include, but not be limited to, providing overall control operations of network node 700; cooperating with other logic, data structures, etc. provisioned for and/or maintained by network node 700; combinations thereof; or the like to facilitate various operations as discussed for various implementations described herein.

In some implementations, a bus 712 may be configured as an interface that enables one or more elements of network node 700 (e.g. processors 702, memory elements 704, control logic 710, etc.) to communicate in order to exchange information and/or data. In at least one embodiment, bus 712 may be implemented as a fast kernel-hosted interconnect, potentially using shared memory between processes (e.g. logic, etc.), which may enable efficient communication paths between the processes.

In some implementations, network function logic 714 may include instructions that, when executed (e.g. via one or more processors 702) cause network node 700 to perform one or more operations for one or more network elements as discussed for various implementations described herein.

Each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Use of any terms such as 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In various embodiments, a system may represent a series of points or nodes of interconnected communication paths (wired or wireless) for receiving and transmitting packets of information that propagate through the system. In various embodiments, the system may be associated with and/or provided by a single network operator or service provider and/or multiple network operators or service providers. In various embodiments, the system may include and/or overlap with, in whole or in part, one or more packet data network(s). The system may offer communicative interfaces between various elements and may be further associated with any local area network (LAN), wireless local area network (WLAN), metropolitan area network (MAN), wide area network (WAN), virtual private network (VPN), RAN, virtual local area network (VLAN), enterprise network, Intranet, extranet, Low Power Wide Area Network (LP-WAN), Low Power Network (LPN), Machine to Machine (M2M) network, IoT Network, or any other appropriate architecture or system that facilitates communications in a network environment.

In various embodiments, a UE may be associated with any electronic device seeking to initiate a flow in the system via some network. The terms 'UE', 'mobile device,' 'mobile radio device,' 'end device', 'user', 'subscriber' or variations thereof may be used herein interchangeably and are inclusive of devices used to initiate a communication, such as a computer, an electronic device such as an IoT device (e.g. an appliance, a thermostat, a sensor, a parking meter, etc.), a Personal Digital Assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code to be executed by a processor, or other similar machine). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a Field Programmable Gate Array or "FPGA," a DSP processor, an EPROM, a controller, an Electrically Erasable PROM or "EEPROM," or an ASIC) that includes digital logic, software, code, electronic instructions, or any suitable combination thereof.

One or more advantages mentioned herein do not in any way suggest that any one of the embodiments necessarily provides all the described advantages or that all the embodiments of the present disclosure necessarily provide any one of the described advantages. References to various features (e.g. elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein, may be inclusive of an executable file comprising instructions that may be understood and processed on a computer, processor, machine, network node combinations thereof or the like and may further include library modules loaded during execution, object files, system files, hardware logic, software logic, or any other executable modules.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first (e.g. NGAP) signaling message could be termed a second signaling message, and similarly, a second signaling message could be termed a first signaling message, without changing the meaning of the description, so long as all occurrences of the "first signaling message" are renamed consistently and all occurrences of the "second signaling message" are renamed consistently. The first signaling message and the second signaling message are both signaling messages, but they are not the same signaling message.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at one or more network nodes comprising an Access and Mobility Management Function (AMF) for managing communications associated with a User Equipment (UE) operative in a Next Generation (NG) Radio Access Network (RAN) (NG-RAN) and for communicating signaling messages with the NG-RAN according to an NG Application Protocol (NGAP),
receiving a registration request message which includes a Subscription Concealed Identity (SUCI) associated with the UE;
identifying, from a set of AMF servers, an initial AMF server for storing a context of a subscriber session of the UE;
allocating a first identifier for NGAP messaging associated with the UE, the first identifier having embedded therein a first value derived based on an initial server ID of the initial AMF server;
receiving a Subscription Permanent Identity (SUPI) associated with the UE;
identifying, from the set of AMF servers, an anchor AMF server based on the SUPI of the UE;
forwarding to and storing at the anchor AMF server the context of the subscriber session of the UE; and
allocating a second identifier for NGAP messages associated with the UE, the second identifier having embedded therein a second value derived based on an anchor server ID of the anchor AMF server.

2. The method of claim 1, further comprising:
in response to receiving an NGAP message which includes the first identifier, selecting from the set of AMF servers the initial AMF server to which to forward the received NGAP message for processing, based on the first value extracted from the first identifier in the NGAP message; and in response to receiving an NGAP message which includes the second identifier, selecting from the set of AMF servers the anchor AMF server to which to forward the received NGAP message for processing, based on the second value extracted from the second identifier in the NGAP message.

3. The method of claim 2, wherein the one or more network nodes comprising the AMF further comprises a server selector which performs the selecting of the initial AMF server and the selecting of the anchor AMF server, the server selector including a load balancer.

4. The method of claim 1, wherein:
identifying the initial AMF server comprises randomly selecting the initial AMF server from the set of AMF servers, or
identifying the initial AMF server comprises selecting the initial AMF server from the set of AMF servers based on the SUCI of the UE.

5. The method of claim 1, wherein:
the context of the subscriber session of the UE is stored at the initial AMF server in a first local data store of the initial AMF server, and
forwarding to and storing at the anchor AMF server the context of the subscriber session of the UE comprises forwarding to and storing at the anchor AMF server the context in a second local data store of the anchor AMF server.

6. The method of claim 1, further comprising:
after the context is stored at the initial AMF server, sending to the NG-RAN a message comprising an initial context setup request which includes the first identifier; and
receiving from the NG-RAN a message comprising an initial context setup response which includes the first identifier, and selecting based on the first identifier the initial AMF server to which to forward and process the message comprising the initial context setup response.

7. The method of claim 6, further comprising:
after the context is stored at the anchor AMF server, sending to the NG-RAN a message comprising a UE context modification request which includes the first and the second identifiers; and
receiving from the NG-RAN a message comprising a UE context modification response which includes the second identifier, and selecting based on the second identifier the anchor AMF server to which to forward and process the message comprising the UE context modification response.

8. The method of claim 1, wherein:
allocating the first identifier includes at least embedding in the first identifier the first value which comprises a first hash result of a hash performed on the initial server ID, and
allocating the second identifier includes at least embedding in the second identifier the second value which comprises a second hash result of a hash performed on the anchor server ID.

9. The method of claim 1, further comprising:
at the initial AMF server, performing an authentication procedure for the UE at least in part by:
sending to an authentication function an authentication request which includes the SUCI of the UE; and
receiving from the authentication function an authentication response which includes the SUPI of the UE.

10. The method of claim 1, wherein identifying the anchor AMF server comprises identifying the anchor AMF server based on a hash result of a hash performed on the SUPI of the UE, the method further comprising:
at a server selector,
in response to receiving over an interface a signaling message which includes the SUPI of the UE, selecting from the set of AMF servers the anchor AMF server to which to forward the received signaling message for processing based on a hash result of a hash performed on the SUPI in the signaling message, and
wherein the interface comprises an N11 interface or a Service Based Interface (SBI).

11. The method of claim 1, wherein:
the first identifier for the NGAP messaging associated with the UE comprises a first AMF-UE-NGAP-ID, and
the second identifier for the NGAP messaging associated with the UE comprises a second AMF-UE-NGAP-ID.

12. One or more network nodes comprising an access and mobility management function (AMF) configured to manage communications associated with a User Equipment (UE) operative in a Next Generation (NG) Radio Access Network (RAN) (NG-RAN) and to communicate signaling messages with the NG-RAN according to an NG Application Protocol (NGAP), the one or more network nodes comprising:
a server selector;
a set of AMF servers;
the server selector being configured to receive a registration request message which includes a Subscription Concealed Identity (SUCI) associated with the UE and identify, from the set of AMF servers, an initial AMF server for storing a context of a subscribers session of the UE;
the initial AMF server being configured to allocate a first identifier for NGAP messaging associated with the UE, the first identifier having embedded therein a first value derived based on an initial server ID of the initial AMF server;
the initial AMF server being configured to receive a Subscription Permanent Identity (SUPI) associated with the UE;
the initial AMF server being configured to identify, from the set of AMF servers, an anchor AMF server based on the SUPI of the UE;
the initial AMF server being configured to forward and store at the anchor AMF server the context of the subscriber session of the UE; and
the anchor AMF server being configured to allocate a second identifier for NGAP messages associated with the UE, the second identifier having embedded therein a second value derived based on an anchor server ID of the anchor AMF server.

13. The one or more network nodes of claim 12, wherein:
the server selector is further configured to, in response to receiving an NGAP message which includes the first identifier, select from the set of AMF servers the initial AMF server to which to forward the received NGAP message for processing based on the first value extracted from the first identifier in the NGAP message, and
the server selector is further configured to, in response to receiving an NGAP message which includes the second identifier, select from the set of AMF servers the anchor AMF server to which to forward the received NGAP message for processing based on the second value extracted from the second identifier in the NGAP message.

14. The one or more network nodes of claim 12, wherein:
the initial AMF server is configured to, after the context is stored at the initial AMF server, send to the NG-RAN a message comprising an initial context setup request which includes the first identifier; and
the server selector is further configured to receive from the NG-RAN a message comprising an initial context setup response which includes the first identifier, and select based on the first identifier the initial AMF server to which to forward and process the message comprising the initial context setup response.

15. The one or more network nodes of claim 14, wherein:
the anchor AMF server is further configured to, after the context is stored at the anchor AMF server, send to the NG-RAN a message comprising a UE context modification request which includes the first and the second identifiers, and
the server selector is further configured to receive from the NG-RAN a message comprising a UE context modification response which includes the second identifier, and select based on the second identifier the anchor AMF server to which to forward and process the message comprising the UE context modification response.

16. A method comprising:
at one or more network nodes comprising an Access and Mobility Management Function (AMF) for managing communications associated with a User Equipment (UE) operative in a Next Generation (NG) Radio Access Network (RAN) (NG-RAN), and for communicating signaling messages with the NG-RAN according to an NG Application Protocol (NGAP),
identifying, from a set of AMF servers, an anchor AMF server based on a Subscription Permanent Identity (SUPI) of the UE;
allocating an identifier for NGAP messages associated with the UE, including at least embedding in the identifier a first value that is derived based on an anchor server ID of the anchor AMF server;
in response to receiving, over an NG interface, an NGAP message which includes the identifier, selecting from the set of AMF servers the anchor AMF server to which to forward the NGAP message for processing, based on the first value extracted from the identifier in the NGAP message; and
in response to receiving, over an interface different from the NG interface, a signaling message which includes the SUPI of the UE, selecting from the set of AMF servers the anchor AMF server to which to forward the received signaling message for processing, based on a second value that is derived based on the SUPI in the signaling message,
wherein the interface different from the NG interface comprises a Service Based Interface (SBI) or an N11 interface.

17. The method of claim 16, wherein the identifier comprises a subsequently-allocated identifier and the NGAP message comprises a subsequent NGAP message, the method comprising:
receiving a registration request message which includes a Subscription Concealed Identity (SUCI) associated with the UE;
identifying, from the set of AMF servers, an initial AMF server to which to forward the registration request message for processing;
allocating an initially-allocated identifier for NGAP messages associated with the UE, including at least embedding in the initially-allocated identifier a third value that is derived based on an initial server ID of the initial AMF server; and
in response to receiving, over the NG interface, an NGAP message which includes the initially-allocated identifier, selecting from the set of AMF servers the initial AMF server to which to forward the NGAP message for processing, based on the third value extracted from the initially-allocated identifier in the NGAP message.

18. The method of claim 17, wherein:
the NGAP message which includes the initially-allocated identifier comprises an authentication response from the NG-RAN which is received in response to an authentication request, or wherein the NGAP message which includes the initially-allocated identifier comprises an initial context setup response from the NG-RAN which is received in response to an initial context setup request, and
the NGAP message which includes the subsequently-allocated identifier comprises a Packet Data Unit (PDU) session establishment request.

19. The method of claim 17, further comprising:
storing a context of a subscriber session of the UE in a local data store of the initial AMF server;
sending to the NG-RAN a message comprising an initial context setup request which includes the initially-allocated identifier; and
receiving from the NG-RAN a message comprising an initial context setup response which includes the initially-allocated identifier.

20. The method of claim 19, further comprising:
after receiving the SUPI and identifying the anchor AMF server, forwarding to the anchor AMF server the context of the subscriber session of the UE;
storing the context of the subscriber session of the UE in a local data store of the anchor AMF server;
sending to the NG-RAN a message comprising a UE context modification request which includes the initially-allocated identifier and the subsequently-allocated identifier; and
receiving from the NG-RAN a message comprising a UE context modification response which includes the subsequently-allocated identifier.

* * * * *